(12) United States Patent
Sio et al.

(10) Patent No.: US 12,170,277 B2
(45) Date of Patent: Dec. 17, 2024

(54) INTEGRATED CIRCUIT AND MANUFACTURING METHOD OF THE SAME

(71) Applicant: TAIWAN SEMICONDUCTOR MANUFACTURING COMPANY, LTD., Hsinchu (TW)

(72) Inventors: Kam-Tou Sio, Hsinchu County (TW); Jiann-Tyng Tzeng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 603 days.

(21) Appl. No.: 17/317,708

(22) Filed: May 11, 2021

(65) Prior Publication Data
US 2022/0254769 A1    Aug. 11, 2022

Related U.S. Application Data

(60) Provisional application No. 63/147,303, filed on Feb. 9, 2021.

(51) Int. Cl.
*H01L 23/528* (2006.01)
*H01L 21/02* (2006.01)
(Continued)

(52) U.S. Cl.
CPC ...... *H01L 27/0207* (2013.01); *H01L 21/0259* (2013.01); *H01L 21/823807* (2013.01);
(Continued)

(58) Field of Classification Search
CPC ............... B82Y 10/00; G06F 2119/06; G06F 30/392; G06F 30/394; H01L 21/0259;
(Continued)

(56) References Cited

U.S. PATENT DOCUMENTS 10,861,936 B2   12/2020   Liaw
11,107,805 B2   8/2021   Li
(Continued)

FOREIGN PATENT DOCUMENTS

EP   3629369 A1   4/2020
JP   2020036034 A   3/2020
(Continued)

OTHER PUBLICATIONS

U.S. Appl. No. 17/314,897, filed May 7, 2021.

*Primary Examiner* — Meiya Li
(74) *Attorney, Agent, or Firm* — Maschoff Brennan

(57) ABSTRACT

An integrated circuit includes a driver cell and at least one transmission cell. The driver cell includes a first active area and a second active area, and a first conductive line coupled to the first active area and the second active area on a back side of the integrated circuit. The at least one transmission cell having a second cell height includes a third active area and a fourth active area, a second conductive line coupled to the third active area and the fourth active area on the back side of the integrated circuit, and a conductor coupled to the third active area and the fourth active area. The integrated circuit further includes a third conductive line coupled between the first conductive line and the second conductive line on the back side to transmit a signal between the driver cell and the at least one transmission cell.

20 Claims, 26 Drawing Sheets

(51) Int. Cl.
 *H01L 21/8238* (2006.01)
 *H01L 27/02* (2006.01)
 *H01L 27/092* (2006.01)
 *H01L 29/06* (2006.01)
 *H01L 29/423* (2006.01)
 *H01L 29/66* (2006.01)
 *H01L 29/786* (2006.01)

(52) U.S. Cl.
 CPC .......... *H01L 21/823871* (2013.01); *H01L 23/5286* (2013.01); *H01L 27/092* (2013.01); *H01L 29/0665* (2013.01); *H01L 29/42392* (2013.01); *H01L 29/66742* (2013.01); *H01L 29/78696* (2013.01)

(58) Field of Classification Search
 CPC ..... H01L 21/823807; H01L 21/823871; H01L 23/5286; H01L 27/0207; H01L 27/092; H01L 29/0665; H01L 29/0673; H01L 29/42392; H01L 29/66742; H01L 29/775; H01L 29/78696
 See application file for complete search history.

(56) References Cited

U.S. PATENT DOCUMENTS

| | | | |
|---|---|---|---|
| 11,271,567 B1* | 3/2022 | Chen | ............ H03K 19/1774 |
| 2002/0020862 A1 | 2/2002 | Livengood et al. | |
| 2015/0187642 A1 | 7/2015 | Batra et al. | |
| 2016/0254061 A1* | 9/2016 | Kanapathippillai | . H01R 12/725 |
| | | | 361/737 |
| 2019/0122987 A1 | 4/2019 | Chen | |
| 2019/0267316 A1 | 8/2019 | Nelson et al. | |
| 2020/0105671 A1 | 4/2020 | Lai | |
| 2020/0266169 A1 | 8/2020 | Kang | |
| 2020/0373242 A1 | 11/2020 | Hiblot | |

FOREIGN PATENT DOCUMENTS

| | | |
|---|---|---|
| KR | 20130102450 A | 9/2013 |
| KR | 101956984 B1 | 3/2019 |
| KR | 20200121739 A | 10/2020 |
| TW | 202010050 | 3/2020 |
| WO | 2018/057042 A1 | 3/2018 |

* cited by examiner

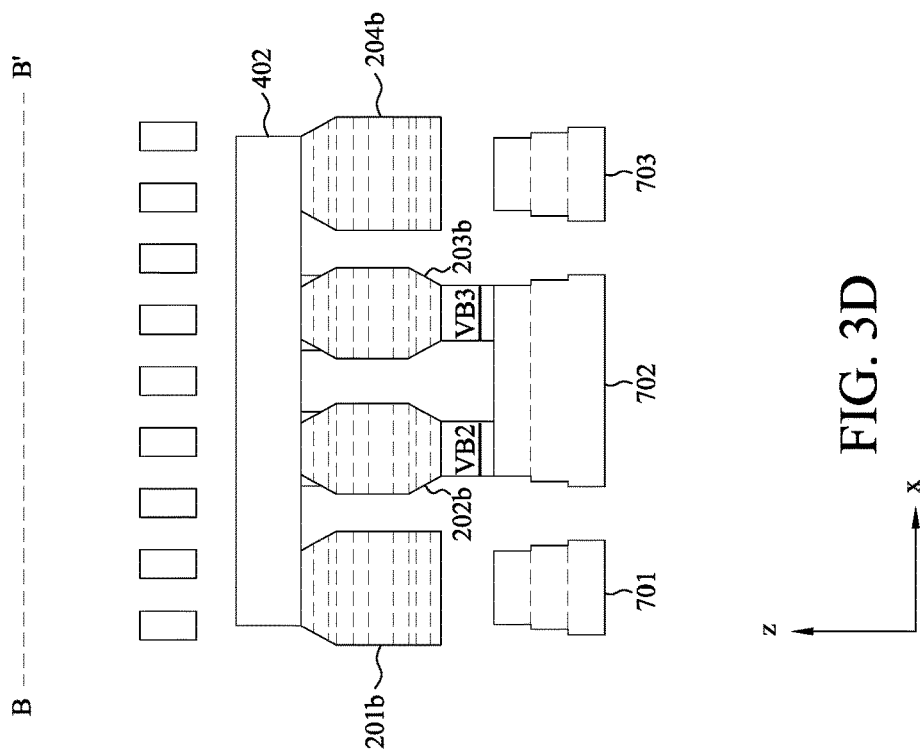
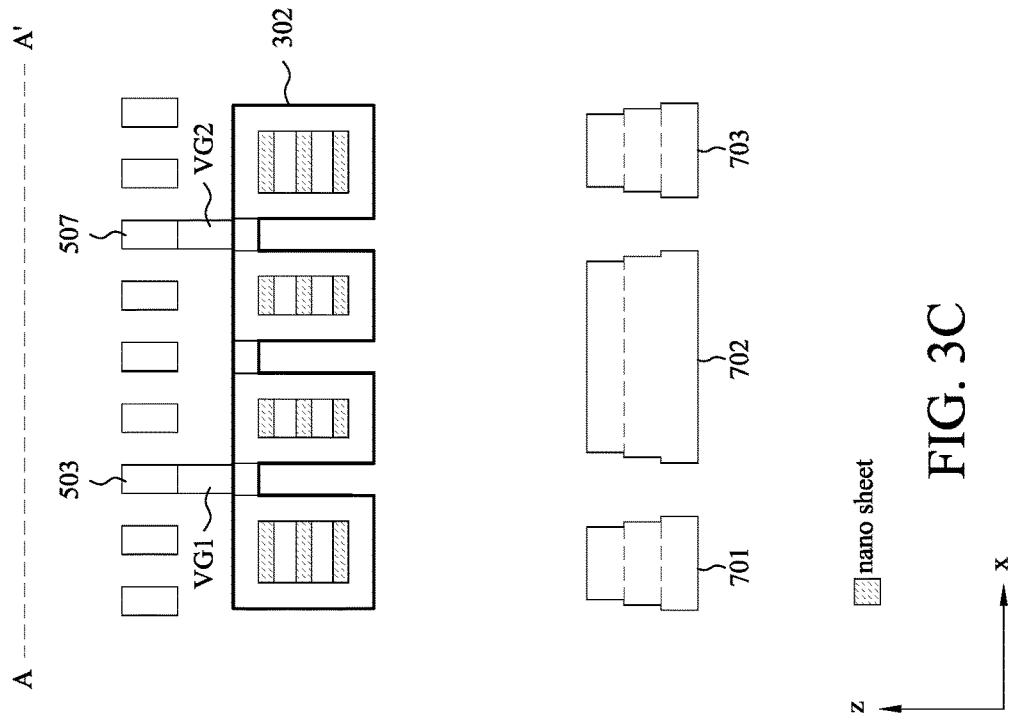
FIG. 3D
FIG. 3C

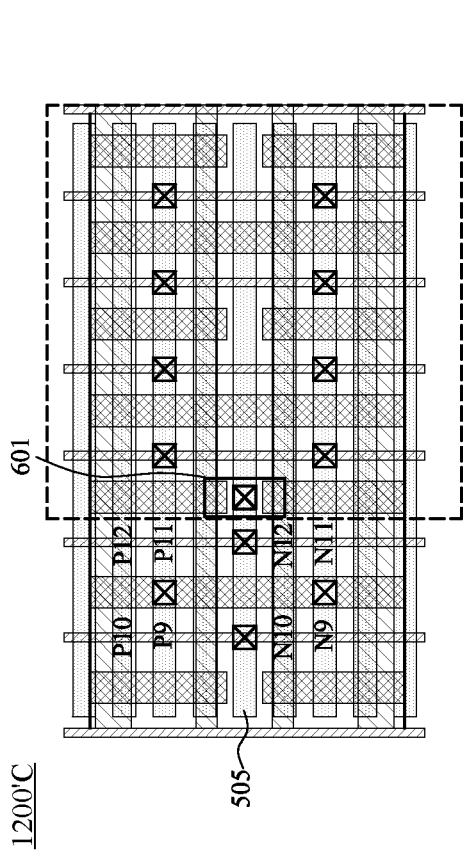
FIG. 15A
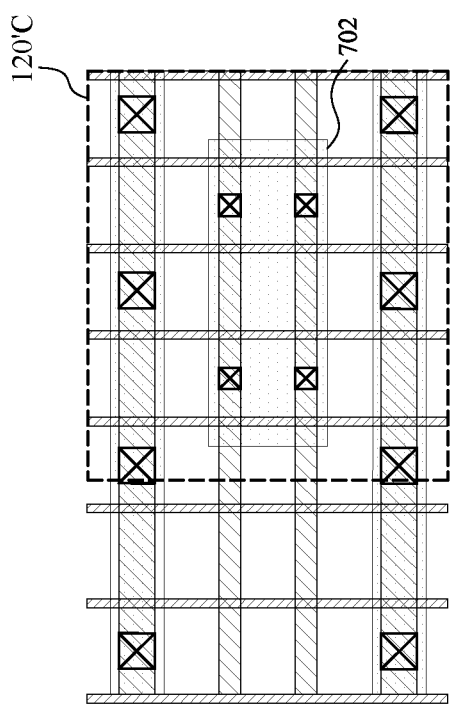
FIG. 15B
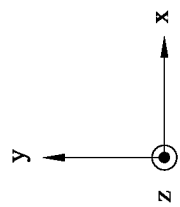

INTEGRATED CIRCUIT AND MANUFACTURING METHOD OF THE SAME

CROSS REFERENCE

The present application claims priority to U.S. Provisional Application No. 63/147,303, filed on Feb. 9, 2021, which is herein incorporated by reference in its entirety.

BACKGROUND

The semiconductor integrated circuit (IC) industry has experienced rapid growth. Technological advances in IC materials and design have produced generations of ICs. In some approaches, optimization of metal track arrangement is considered for long-distance signal transmission.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3C-3F are cross-sectional views of the layout diagram of the driver circuit in FIGS. 3A-3B along lines AA', BB', CC', and DD' separately, in accordance with some embodiments.

FIGS. 15A-15B are layout diagrams in a plan view of a section of the driver circuit in FIG. 14, in accordance with some embodiments.

DETAILED DESCRIPTION

Figure 1:
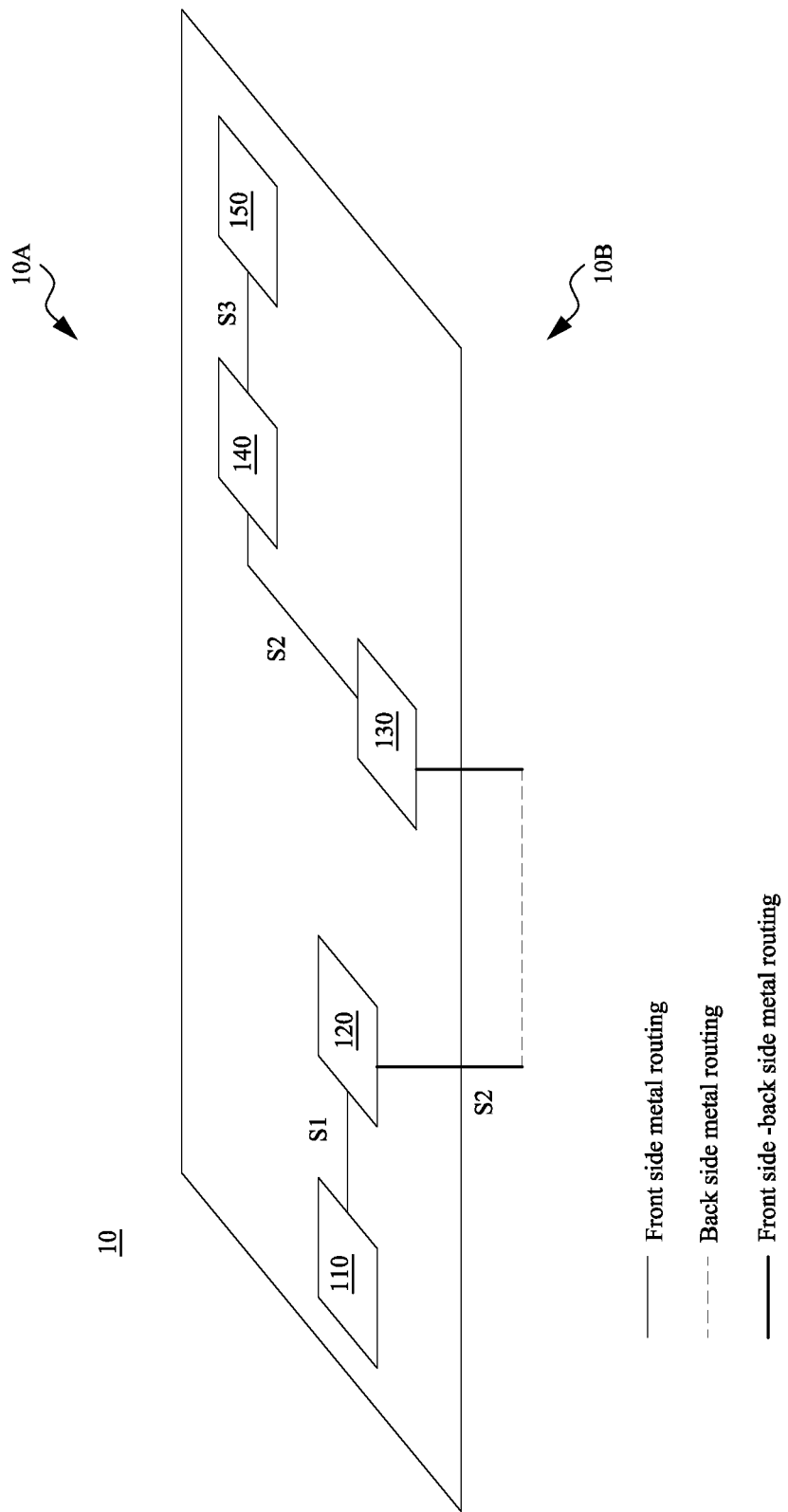
FIG. 1 is a schematic diagram of an integrated circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Reference is now made to FIG. 1. FIG. 1 is a schematic diagram of an integrated circuit 10, in accordance with some embodiments. In some embodiments, the integrated circuit 10 is referred to as an integrated circuit including at least one active device (e.g., a logic circuit or a driver circuit or a receiver circuit with drain/source structure implements with active areas, gate structures, metal-on-device MD on the active areas, etc.) coupled to front side metal routing on its front side and metal routing on its backside. In some embodiments, the active device on the front side of the integrated circuit 10 is formed on a substrate (not shown) in a front side process. After the front side process is complete, the integrated circuit 10 is flipped upside down, such that a backside surface of the substrate faces upwards. The substrate is further thinned down and removed. In some embodiments, thinning is accomplished by a chemical-mechanical polishing (CMP) process, a grinding process, or the like. Accordingly, backside process is performed to form structures on the backside of the integrated circuit 10.

For illustration, the integrated circuit 10 includes a logic circuit 110, a driver circuit 120, a transmission unit 130, a receiver circuit 140, and a logic circuit 150. In some embodiments, the logic circuit 110 transmits a signal S1, such like a signal having a logic value, to the driver circuit 120 through metal routing on a front side 10A of the integrated circuit 10. The driver circuit 120 receives the signal S1 and further outputs a signal S2 associated with the signal S1 to the transmission unit 130 through metal routing on a back side 10B, opposite to the front side 10A, of the integrated circuit 10. The transmission unit 130 receives the signal S2 and outputs the signal S2 to the receiver circuit 140 through another portion of front side metal routing. Consequently, the receiver circuit 140 outputs a signal S3 associated with the signal S2 to the logic circuit 150.

In some embodiments, the logic circuits 110 and 150 include AND, OR, NAND, multiplexer (MUX), Flip-flop, Latch, buffer (BUFF) or any other types of logic circuit. The driver circuit 120 and the receiver circuit 140 include a buffer circuit or an inverter circuit. The equivalent circuit of the integrated circuit 10 is given for illustrative purposes. Various configurations of the integrated circuit 10 are within the contemplated scope of the present disclosure. For example, in some embodiments, the driver circuit 120 and the receiver circuit 140 include AND, OR, NAND, MUX, Flip-flop, Latch or any other types of logic circuit.

Figure 2:
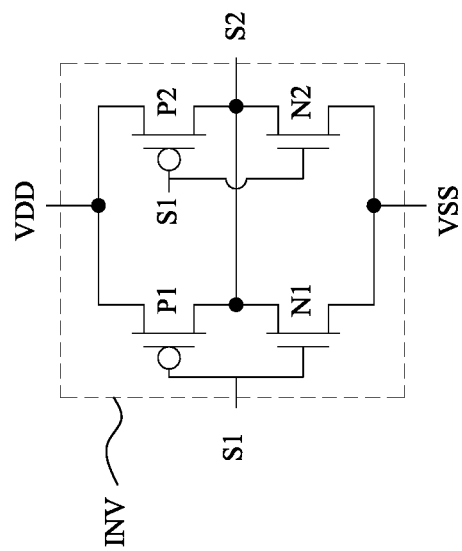
FIG. 2 is a schematic circuit diagram of a driver circuit in the integrated circuit of FIG. 1, in accordance with some embodiments.

Reference is now made to FIG. 2. FIG. 2 is a schematic circuit diagram of the driver circuit 120 in the integrated circuit 10 of FIG. 1, in accordance with some embodiments. For illustration, the driver circuit 120 includes inverters INV coupled in parallel between two supply voltage terminals VDD (providing a supply voltage VDD) and VSS (providing a supply voltage VSS lower than VDD). As shown in FIG. 2, inverter INV includes at least one P-type transistor and at least one N-type transistor that are coupled in series. Specifically, in the embodiments of FIG. 2, the transistors P1 and N1 included in the inverter are coupled in series and operate with the supply voltage VDD received at a source terminal of the transistor P1 and the supply voltage VSS received at a source terminal of the transistor N1. The transistors P1 and N1 receive the signal S1 at gate terminals and further output the signal S2 at drain terminals. The configurations of transistors P2 and N2 are similar to that of the transistors P1 and N1. Hence, the repetitious descriptions are omitted here.

The configurations of FIG. 2 are given for illustrative purposes. Various implements are within the contemplated scope of the present disclosure. For example, in some embodiments, the driver circuit 120 includes one inverter INV having two transistors.

Figure 3A:
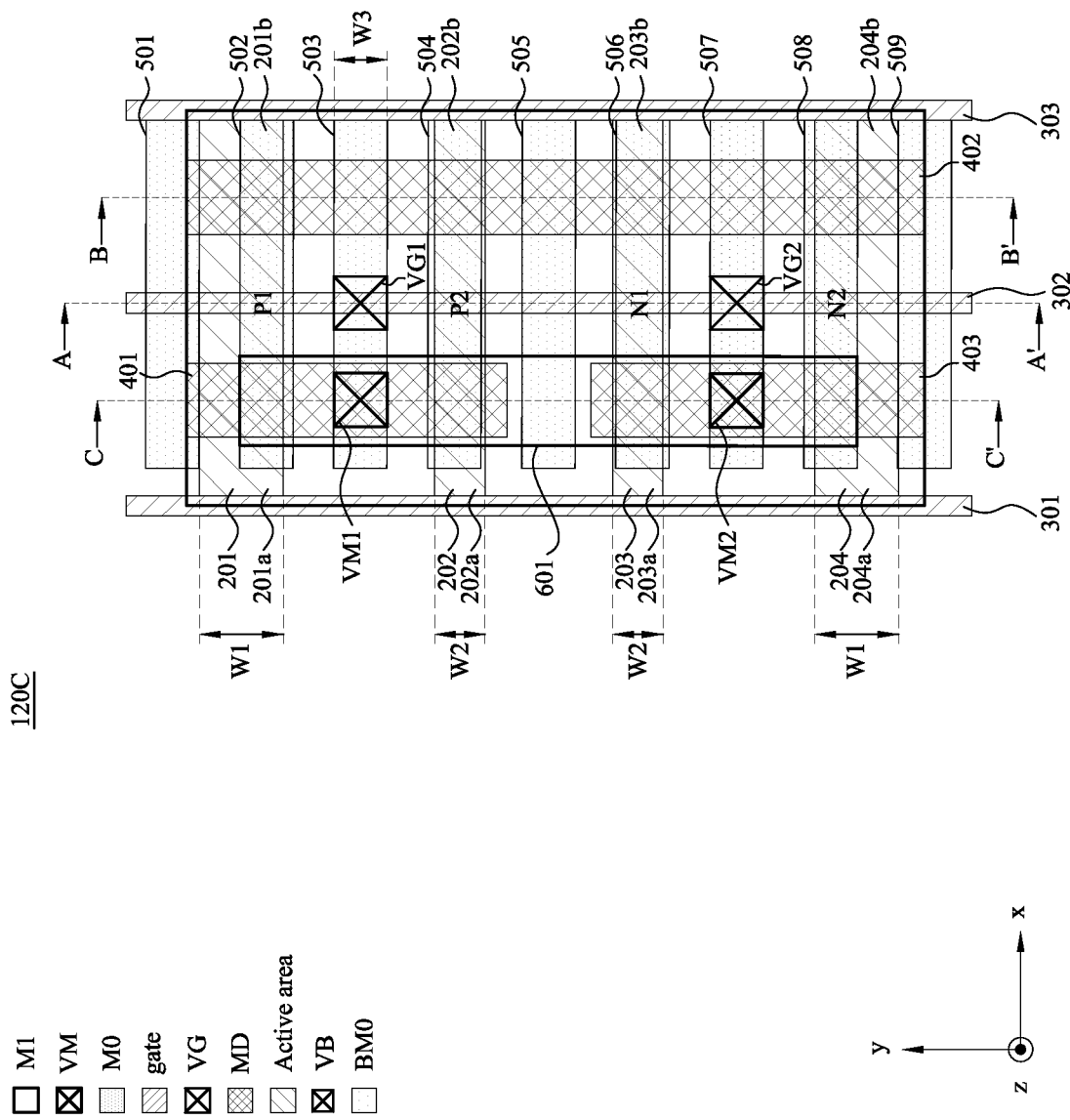
FIGS. 3A-3B are layout diagrams in a plan view of a section of the driver circuit in FIG. 2, in accordance with some embodiments.

Reference is now made to FIG. 3A. FIG. 3A is layout diagrams in a plan view of a section of the driver circuit 120 in FIG. 2, in accordance with some embodiments. In some embodiments, the driver circuit 120 is referred to as being included in the driver cell 120C in the layout diagram. For illustration, the driver cell 120C includes active areas 201-204, gates 301-303, conductors (for example, metal-on-devices MD) 401-403, conductive lines (for example, metal-zero layers Mo) 501-509, a conductive trace (for example, a metal-one layer M1) 601, and vias VM1-VM2, VG1-VG2. In some embodiments, the active areas 201-204 are disposed on a substrate in a first layer on the front side of the integrated circuit 10. The gates 301-303 and the conductors 401-403 are disposed in a second layer above the first layer on the front side. The conductive lines 501-509 are disposed in a third layer above the second layer on the front side. The conductive trace 601 is disposed in a fourth layer above the third layer on the front side. The vias VG1-VG2 are arranged between the second layer and the third layer, and the vias VM1-VM2 are arranged between the third layer and the fourth layer.

In some embodiments, the conductor 401 corresponds to the source terminals of the transistors P1-P2. The conductor 402 corresponds to the drain terminals of the transistors P1-P2 and N1-N2. The conductor 403 corresponds to the source terminals of the transistors N1-N2. The gate 302 corresponds to the gate terminals of the transistors P1-P2 and N1-N2. The gates 301 and 303 are referred to as dummy gates, in which in some embodiments, the "dummy" gates are referred to as being not electrically connected as the gates for metal-oxide-semiconductor (MOS) devices, having no function in the circuit.

For illustration, the active areas 201-204 extend in x direction and are separated from each other in y direction. Along y direction, the active areas 201 and 204 have a width W1 while the active areas 202 and 203 have a width W2. In some embodiments, the width W1 is greater than the width W2, which parts of the active areas 201 and 204 are included in structures corresponding to the source terminals of the transistors P1 and N1 to receive the supply voltages VDD and VSS respectively. In such embodiments, a reduced resistance in transmitting the supply voltages VDD and VSS is achieved.

In some embodiments, each of the active area having the width W1 includes a second one fin-shaped structure (not shown), and each of the active area having the width W2 includes a second two fin-shaped structure (not shown). The fins are patterned by any suitable method. For example, the fins are patterned using one or more photolithography processes, including double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used to pattern the fins. In some embodiments, such active area includes one or more fin-shaped structures of one or more three-dimensional field-effect-transistors (e.g., FinFETs, gate-all-around (GAA) transistors), or an oxide-definition (OD) region of one or more planar metal-oxide-semiconductor field-effect transistors (MOSFETs). The active areas serve as a source feature or a drain feature of the respective transistor(s).

In some embodiments, the active areas 201-202 are P-type doped areas in metal-oxide-semiconductor field-effect transistors P1-P2, and the active areas 203-204 are N-type doped areas in metal-oxide-semiconductor field-effect transistors N1-N2.

The gates 301-303 extend in y direction and are separated from each other in x direction. For illustration, the gate 302 crosses over the active areas 201-204.

The conductors 401-403 extend in y direction. The conductor 401 crosses over the active areas 201-202, the conductor 403 crosses over the active areas 203-204, and the conductor 402 crosses over the active areas 201-204. Moreover, the active area 201 includes active regions 201a-201b, the active area 202 includes active regions 202a-202b, the active area 203 includes active regions 203a-203b, and the active area 204 includes active regions 204a-204b. Accordingly, in FIG. 3A, the conductor 401 is coupled to the active regions 201a and 202a, the conductor 403 is coupled to the active regions 203a and 204a, and the conductor 403 is coupled to the active regions 201b, 202b, 203b and 204b.

The conductive lines 501-509 extend in x direction and are separated from each other in y direction. The conductive trace 601 extends in y direction and crosses over the conductive lines 502-508. The vias VM1-VM2 couple the conductive trace 601 to the conductive lines 503 and 507 respectively. The vias VG1-VG2 couple the gate 302 to the conductive lines 503 and 507 respectively. In some embodiments, the conductive trace 601 is configured to receive the signal S1 for the driver circuit 120 and the signal S1 is transmitted to the conductive lines 503 and 507 through the vias VM1 and VM2. Then, the conductive lines 503 and 507 transmit the signal S1 to the gate 302 through the vias VG1-VG2 respectively. Alternatively stated, the driver circuit (cell) 120 receives the signal S1 through at least one of the conductive lines 503, 507, and the conductive trace 601 as its input terminal on the front side of the integrated circuit 10.

Figure 3B:
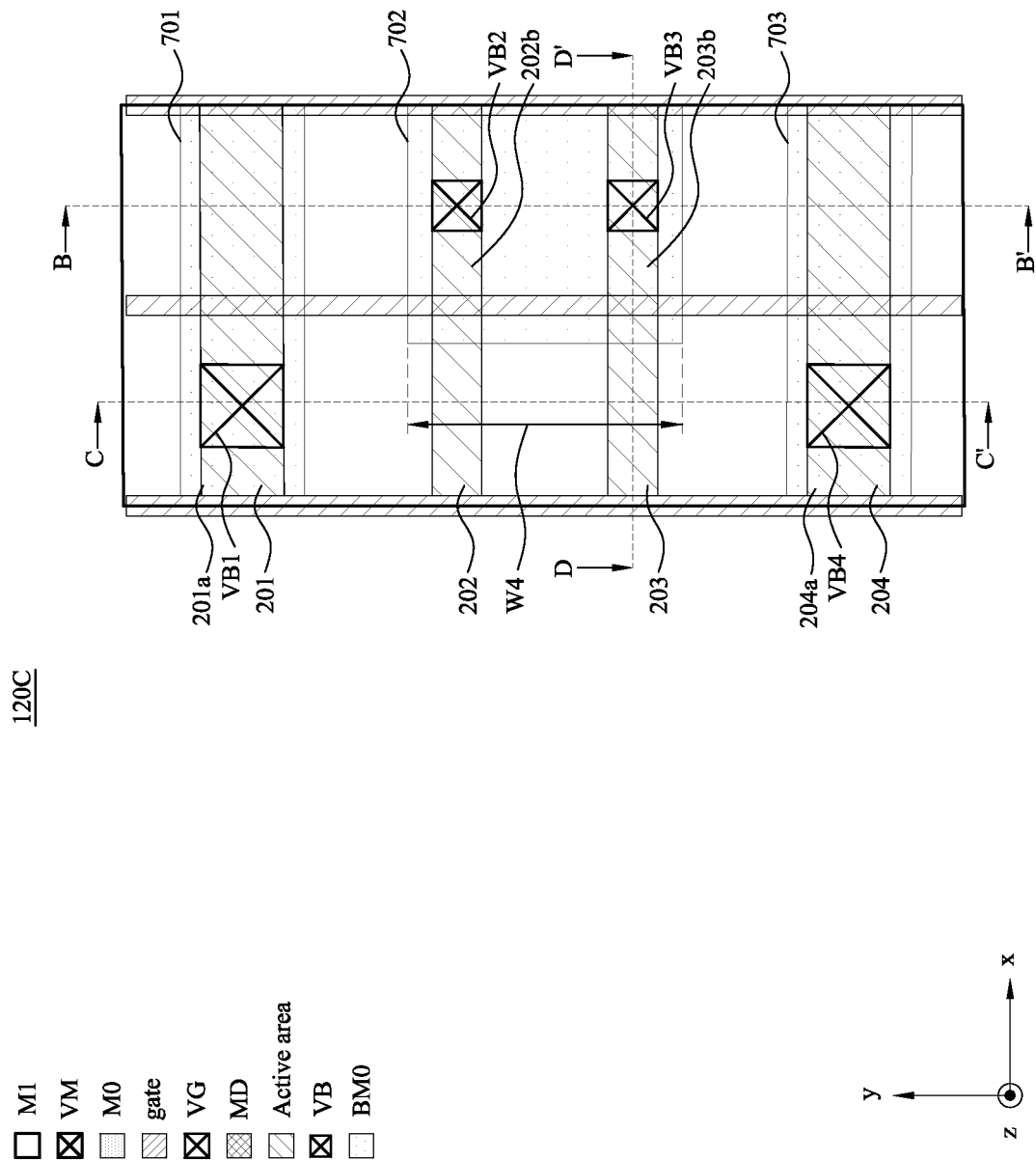

Reference is now made to FIG. 3B. FIG. 3B is layout diagrams in a plan view of the section of the driver circuit 120 in FIG. 3A, in accordance with some embodiments. As shown in FIG. 3B, the driver cell 120C further includes back side conductive lines (for example, back side metal-zero layers BMo) 701-703. In some embodiments, the back side conductive lines 701-703 are disposed in a first layer on the back side of the integrated circuit 10. For illustration, the back side conductive lines 701-703 extend in x direction and are separated from each other in y direction. In a layout view, the back side conductive line 701 overlaps the active area 201, the back side conductive line 702 overlaps the active areas 202-203, and the back side conductive line 703 overlaps the active area 204.

The driver cell 120C further includes vias VB1-VB4. As shown in FIG. 3B, the via VB1 couples the back side conductive line 701 to the active region 201a, and the via VB4 couples the back side conductive line 703 to the active region 204a. In some embodiments, the back side conductive line 701 is configured as a power rail to receive the supply voltage VDD transmitted from the back side of the integrated circuit 10 for the driver cell 120C, and the back side conductive line 703 is configured as another power rail to receive the supply voltage VSS transmitted from the back side of the integrated circuit 10 for the driver cell 120C.

The back side conductive line 702 is arranged between the pair of power rails 701 and 703 and couples the active areas 201 and 203 through the vias VB2 and VB3. Specifically, the via VB2 couples the back side conductive line 702 to the active region 202b, and the via VB3 couples the back side conductive line 702 to the active region 203b. In some embodiments, the active regions 202b and 203b are coupled to the conductor 402 as the drain terminals of transistors P1-P2 and N1-N2, and accordingly, the back side conductive line 702 is configured as an output terminal of the driver circuit (cell) 120 on the back side to output the signal S2.

Furthermore, with reference to FIGS. 3A-3B together, each of the conductive lines 501-509 has a width W3, and the back side conductive line 702 has a width W4 in y direction. In some embodiments, the width W3 is different from and smaller than the width W4. Accordingly, the signal transmitted through the back side conductive line 702 experiences a less resistance than through the front side metal, for example, the conductive lines 501-509.

Reference is now made to FIGS. 3C-3F. FIGS. 3C-3F are cross-sectional views of the layout diagram of the driver circuit (cell) 120 in FIGS. 3A-3B along lines AA', BB', CC', and DD' separately, in accordance with some embodiments.

In FIG. 3C, a cross-sectional view of the gate 302 along line AA' in FIG. 3A is given. For illustration, the gate 302 is formed around channel regions of the transistors P1-P2 and N1-N2. In some embodiments, the channel regions include structures of nano-sheet. In various embodiments, the channel regions include structures of round/square wire, nanoslab, multi-bridge channel, nano-ring or any other suitable kinds of the nano structures. Moreover, the gate 302 includes a gate dielectric layer (not shown) and a gate electrode layer coupled to the vias VG1-VG2.

In FIG. 3D, a cross-sectional view of the conductor 402 along line BB' in FIG. 3A is given. As illustratively shown in FIG. 3D, the via VB2 is disposed interposed and coupled between the back side conductive line 702 and the active region 202b, and the via VB3 is disposed interposed and coupled between the back side conductive line 702 and the active region 203b. Accordingly, the conductor 402 is coupled to the back side conductive line 702.

Figure 3F:
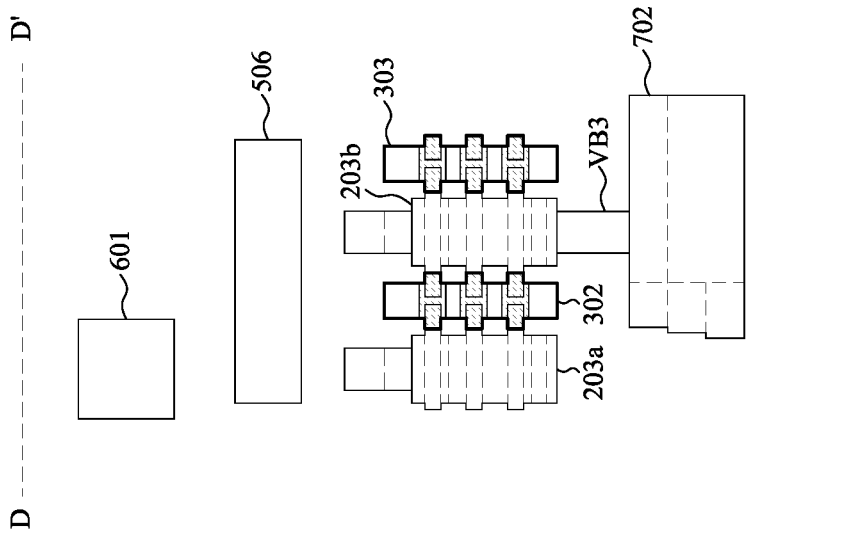
Figure 3E:
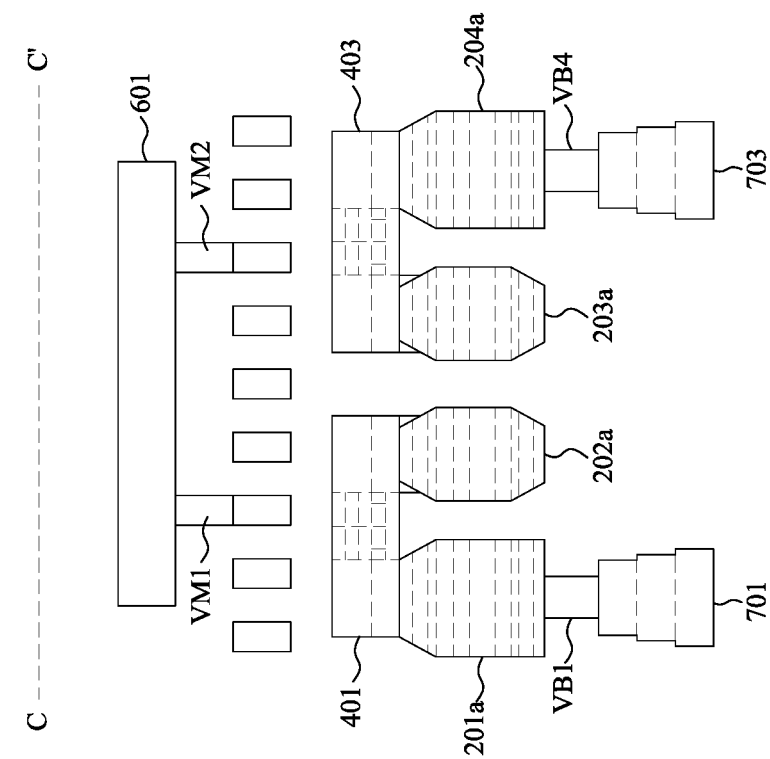

In FIG. 3E, a cross-sectional view of the conductive trace 601 along line CC' in FIG. 3A is given. For illustration, on the back side of the integrated circuit 10, the via VB1 is disposed interposed between the active region 201a and the back side conductive line 701, and the via VB4 is disposed interposed between the active region 204a and the back side conductive line 703. Accordingly, the conductor 401 is coupled to the back side conductive line 701, and the conductor 403 is coupled to the back side conductive line 703.

In FIG. 3F, a cross-sectional view of the conductive line 506 along line DD' in FIG. 3B is given. The gates 302 and 303 have the same structure including channel regions extending in x direction.

The configurations of FIGS. 2, and 3A-3F are given for illustrative purposes. Various implements are within the contemplated scope of the present disclosure. For example, in some embodiments, the width W1 equals the width W2.

Figure 4:
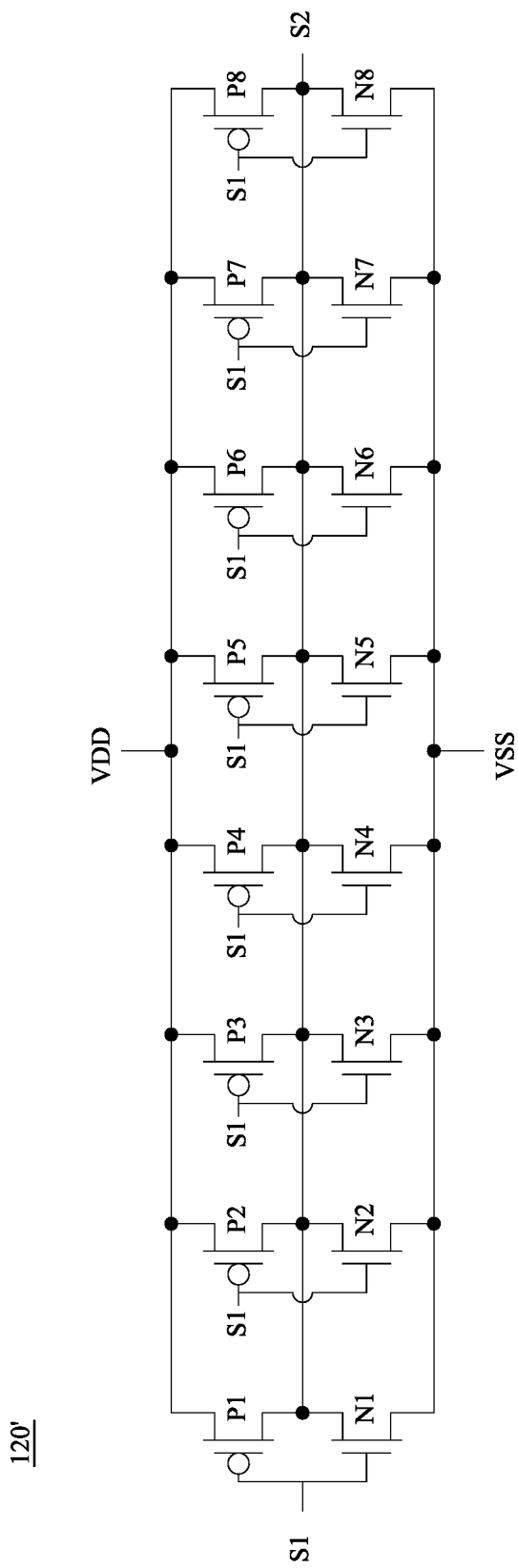
FIG. 4 is a schematic circuit diagram of a driver circuit, in accordance with another embodiment.

Reference is now made to FIG. 4. FIG. 4 is a schematic circuit diagram of a driver circuit 120', in accordance with another embodiment. With respect to the embodiments of FIGS. 1, 2, and 3A-3F, like elements in FIG. 4 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 4.

In some embodiments, the driver circuit 120' is configured with respect to the driver circuit 120 in FIG. 2. Compared with FIG. 2, instead of having two P-type transistors and two N-type transistors, the driver circuit 120' further includes transistors P3-P8 and N3-N8. For illustration, gates terminals of the transistors P3-P8 and N3-N8 are coupled together to receive the signal S1. Source terminals of the transistors P3-P8 are coupled to the supply voltage terminal VDD, and source terminals of the transistors N3-N8 are coupled to the supply voltage terminal VSS. Drain terminals of the transistors P1-P8 and N1-N8 are coupled together to output the signal S2. Accordingly, the transistors included in the driver circuit 120' are configured as the inverter to invert the signal S1 to generate the signal S2.

Figure 5A:
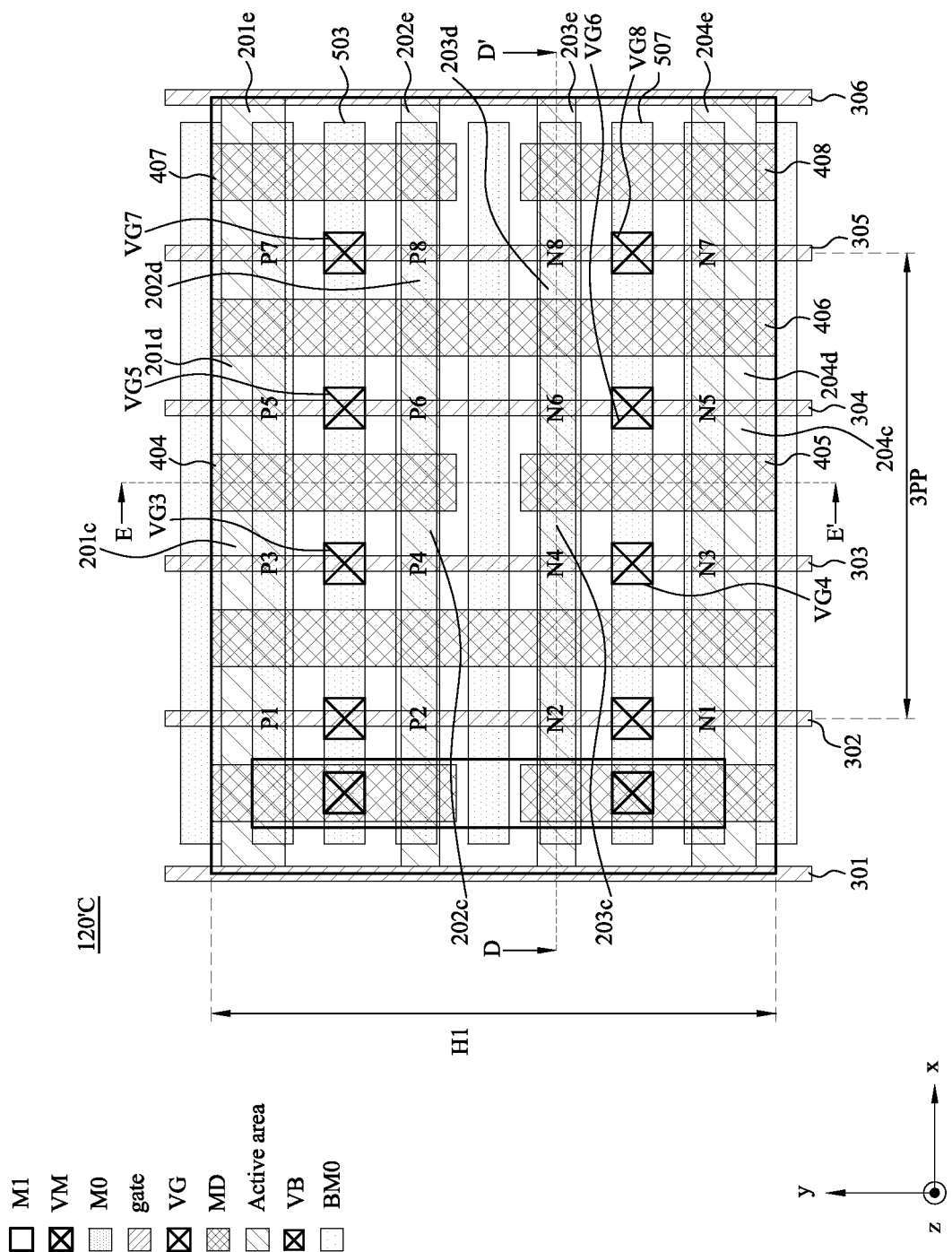
FIGS. 5A-5B are layout diagrams in a plan view of a section of the driver circuit in FIG. 4, in accordance with some embodiments.
Figure 5B:
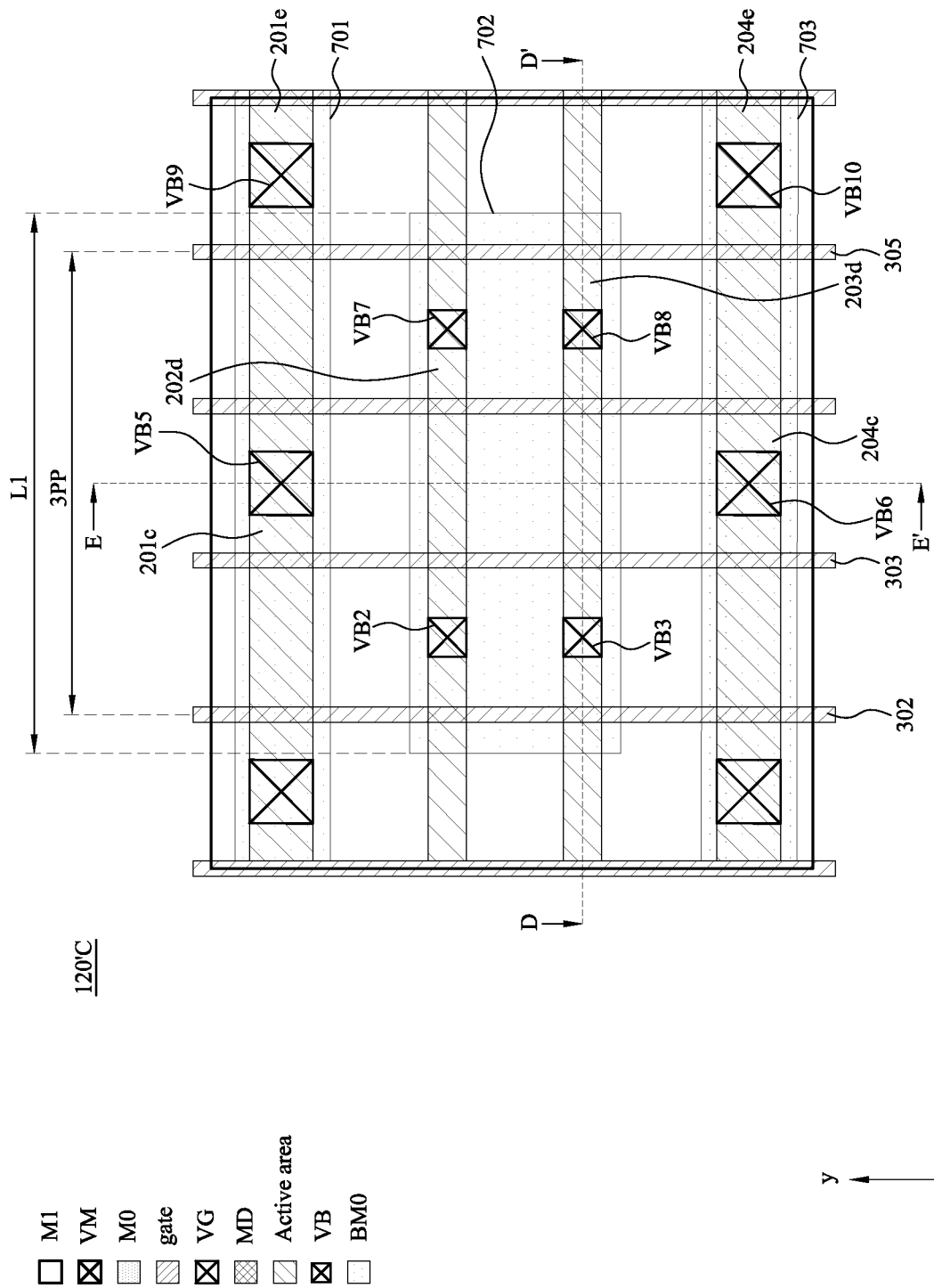

Reference is now made to FIGS. 5A-5B. FIGS. 5A-5B are layout diagrams in a plan view of a section of the driver circuit 120' in FIG. 4, in accordance with some embodiments. With respect to the embodiments of FIGS. 1-4, like elements in FIGS. 5A-5B are designated with the same reference numbers for ease of understanding.

In some embodiments, the driver circuit 120' is referred to as being included in the driver cell 120'C in the layout diagram. Compared with FIG. 3A, the driver cell 120'C in FIG. 5A further includes gates 304-306, conductors 404-408, and vias VG3-VG8. In some embodiments, the gate 304 is configured with respect to, for example, the gate 302. The conductors 404-405 and 407-408 are configured with respect to, for example, the conductor 401. The conductor 406 is configured with respect to, for example, the conductor 402.

In some embodiments, the conductor 404 corresponds to the source terminals of the transistors P3-P6. The conductor 405 corresponds to the source terminals of the transistors N3-N6. The conductor 406 corresponds to the drain terminals of the transistors P5-P8 and N5-N8. The conductor 407 corresponds to the source terminals of the transistors P7-P8. The conductor 408 corresponds to the source terminals of the transistors N7-N8. The gate 303 corresponds to the gate terminals of the transistors P3-P4 and N3-N4. The gate 304 corresponds to the gate terminals of the transistors P5-P6 and N5-N6. The gate 305 corresponds to the gate terminals of the transistors P7-P8 and N7-N8. The gate 306 is referred to as a dummy gate.

For illustration, the vias VG3, VG5, and VG7 couple the gates 303-305 to the conductive line 503, and the vias VG4, VG6, and VG8 couple the gates 303-305 to the conductive line 507. Accordingly, with reference to FIGS. 4 and 5A together, the signal S1 received from the conductive trace 601 is transmitted to the gates 303-305 through the conductive lines 503 and 507.

As illustratively shown in FIG. 5B, compared with FIG. 3B, the driver cell 120'C further includes vias VB5-VB10. For illustration, the vias VB5 and VB9 couple the back side conductive line 701 to active regions 201c and 201e of the active area 201 respectively. Accordingly, the back side conductive line 701 receives the supply voltage VDD for the transistors P3-P8 in FIGS. 4 and 5A. The vias VB6 and VB10 couple the back side conductive line 703 to active regions 204c and 204e of the active area 204 respectively. Accordingly, the back side conductive line 703 receives the supply voltage VSS for the transistors N3-N8 in FIGS. 4 and 5A.

For illustration, in x direction, the via VB7 is separated from the via VB2, and the via VB8 is separated from the via VB3. The back side conductive line 702 in FIG. 5B further couples the active areas 201 and 203 through the vias VB7 and VB8. Specifically, the via VB7 couples the back side conductive line 702 to an active region 202d of the active area 202, and the via VB8 couples the back side conductive line 702 to an active region 203d of the active area 203. In some embodiments, the active regions 202d and 203d are coupled to the conductor 406 as the drain terminals of transistors P5-P8 and N5-N8. Accordingly, the back side conductive line 702 is configured as an output terminal of the driver circuit (cell) 120' on the back side to output the signal S2.

For illustration, the back side conductive line 702 has a length L1 along x direction. In some embodiments, the length L1 is at least three times the length of a pitch between two adjacent gates. For example, as shown in FIG. 5B, the length L1 is greater than a distance 3PP, equal 3 times of a poly pitch (PP), between the gates 302 and 305, in which the poly pitch is a distance between two adjacent gates (e.g., the gates 302-303).

Figures 5C, 5D:
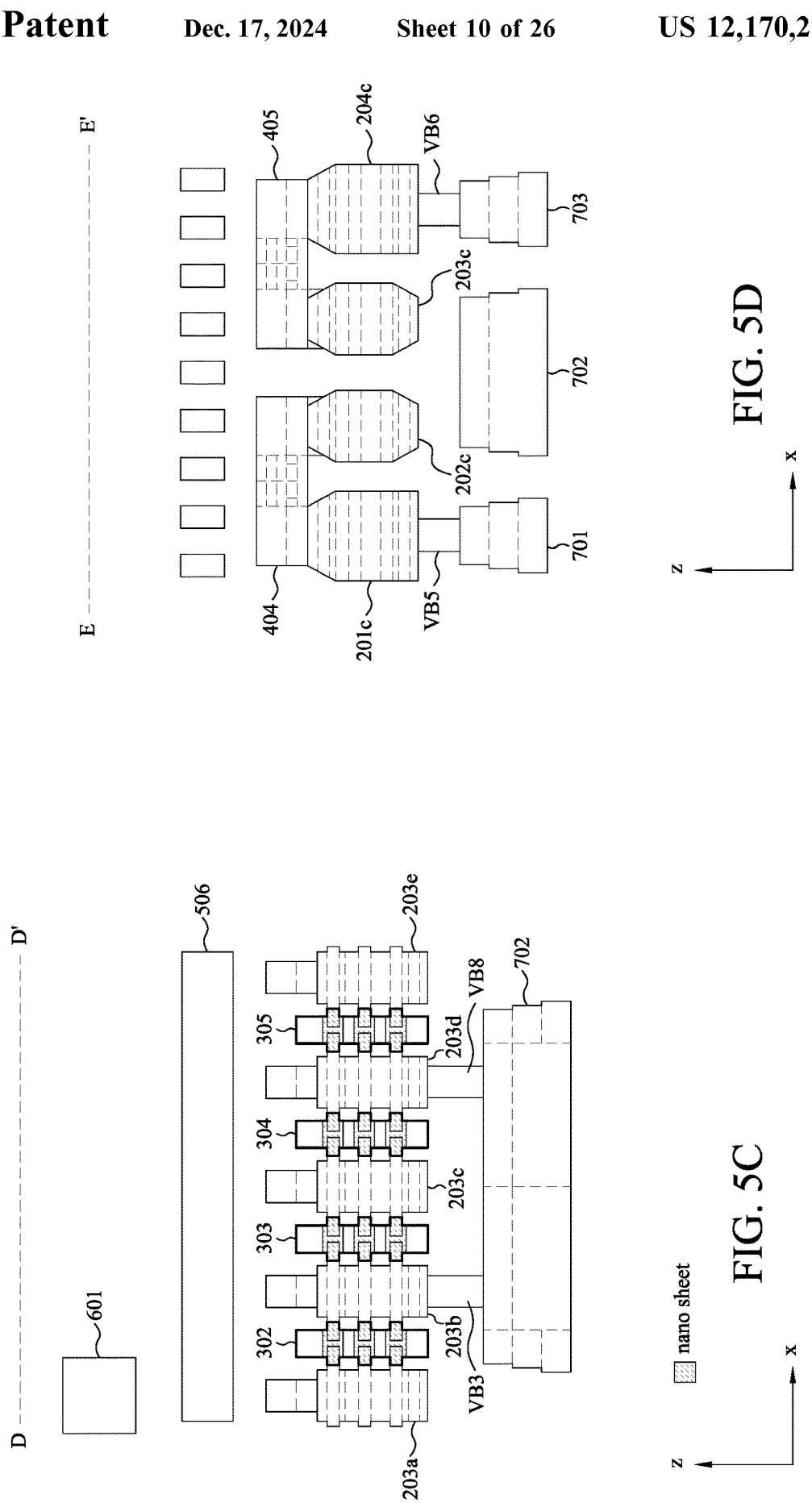
FIGS. 5C-5D are cross-sectional views of the layout diagram of the driver circuit in FIGS. 5A-5B along lines DD' and EE', in accordance with some embodiments.

Reference is now made to FIGS. 5C-5D. FIGS. 5C-5D are cross-sectional views of the layout diagram of the driver circuit 120' in FIGS. 5A-5B along lines DD' and EE', in accordance with some embodiments.

In FIG. 5C, a cross-sectional view of the conductive line 506 along line DD' in FIG. 5B is given. For illustration, the gates 302-305 have the same structure including channel regions extending in x direction. The via VB3 is disposed interposed and coupled between the active region 203b and the back side conductive line 702, and the via VB8 is disposed interposed and coupled between the active region 203d and the back side conductive line 702.

In FIG. 5D, a cross-sectional view of the conductors 404-405 along line EE' in FIG. 5A is given. For illustration, the via VB5 is disposed interposed between the active region 201c and the back side conductive line 701, and the via VB6 is disposed interposed between the active region 204c and the back side conductive line 703. Accordingly, the conductor 404 is coupled to the back side conductive line 701, and the conductor 405 is coupled to the back side conductive line 703.

The configurations of FIGS. 4 and 5A-5D are given for illustrative purposes. Various implements are within the contemplated scope of the present disclosure. For example, in some embodiments, the driver circuit 120' includes more than 16 transistors operating as the inverters.

Figure 6A:
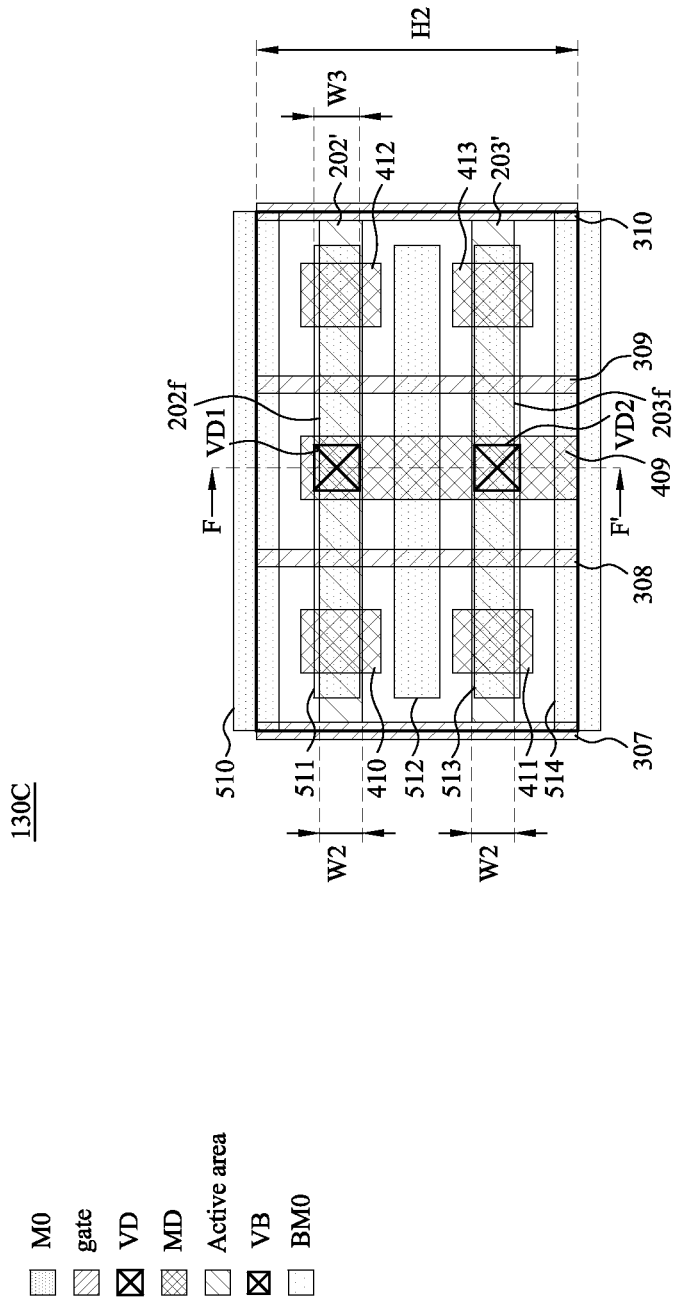
FIGS. 6A-6B are layout diagrams in a plan view of a section of a transmission unit in the integrated circuit in FIG. 1, in accordance with some embodiments.
Figure 6B:
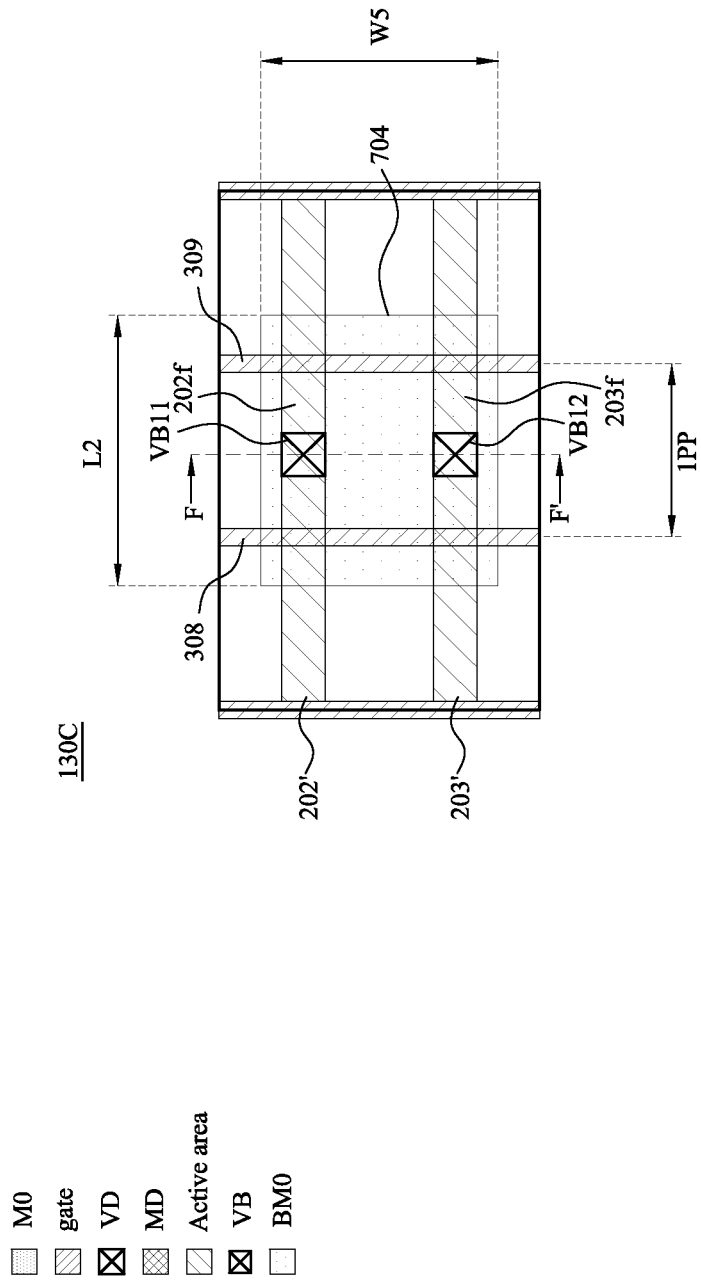

Reference is now made to FIGS. 6A-6B. FIGS. 6A-6B are layout diagrams in a plan view of a section of the transmission unit 130 in the integrated circuit 10 in FIG. 1, in accordance with some embodiments. In some embodiments, the transmission unit 130 is referred to as being included in the transmission cell 130C in the layout diagram.

For illustration, the transmission cell 130° C. includes active areas 202', 203', gates 307-310, conductors (MD) 410-413, conductive lines (Mo) 510-514, and vias VD1-VD2. In some embodiments, the active areas 202' and 203' are configured with respect to, for example, the active areas 202-203. In some embodiments, the gates 307-310 are configured with respect to, for example, the gate 301. The conductors 410-413 are configured with respect to, for example, the conductor 402. The conductive lines 510-514 are configured with respect to, for example, the conductive line 503.

Specifically, the active areas 202' and 203' extend in x direction and have the width W2. the gates 307-310 extend in y direction, cross the active areas 202-203, and are separated from each other in x direction. The conductor 409 crosses over the active areas 202-203 along y direction. The conductors 410 and 412 cross the active area 202, and the conductors 411 and 413 cross the active area 203. The conductive lines 510-514 extend in x direction and are separated from each other in y direction. The via VD1 couples the conductor 409 to the conductive line 511, and the via VD2 couples the conductor 409 to the conductive line 513.

In addition, with reference to FIGS. 5A and 6A, along y direction, the driver cell 120C has a cell height H1 and the transmission cell 130° C. has a cell height H2. In some embodiments, the cell heights H1 and H2 are different from each other. In another embodiment, the cell height H2 is smaller than the cell height H1. In yet another embodiment, the cell height H1 is twice as long as the cell height H2.

In FIG. 6B, the transmission cell 130C further includes a back side conductive line(BMo) 704 and vias VB11-VB12. In some embodiments, the back side conductive line 704 is configured with respect to, for example, the back side conductive line 702. The vias VB11-VB12 are configured with respect to, for example, the via VB3. The via VB11 couples an active region 202f of the active area 202' to the back side conductive line 704, and the via VB12 couples an active region 203f of the active area 203' to the back side conductive line 704.

For illustration, the back side conductive line 704 extends and has a length L2 in x direction. In some embodiments, as shown in FIG. 6B, the length L2 is greater than the length of a poly pitch between two adjacent gates 308-309. Moreover, the back side conductive line 704 has a width W5 in y direction. In some embodiments, the width W5 of the back side conductive line 704 is the same as the width W4 of the back side conductive line 702 in FIG. 5B.

Figure 6C:
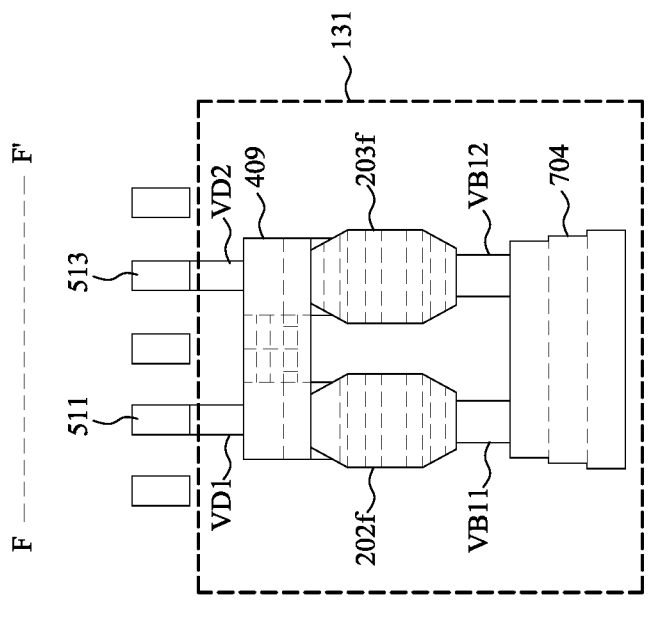
FIG. 6C is cross-sectional view of the layout diagram of the transmission unit in FIGS. 6A-6B along line FF', in accordance with some embodiments.

Reference is now made to FIG. 6C. FIG. 6C is cross-sectional view of the layout diagram of the transmission unit 130 in FIGS. 6A-6B along line FF', in accordance with some embodiments. As illustratively shown in FIG. 6C, the vias VD1-VD2 are disposed and coupled between the conductor 409 and the conductive lines 511 and 513. The vias VB11 and VB12 are disposed and coupled between the active regions 202f, 203f and the back side conductive line 704. Accordingly, the back side conductive line 704 is coupled to the conductive lines 511 and 513. Alternatively stated, the back side conductive line 704, the vias VB11-VB12, the active regions 202f, 203f, the conductor 409, and the vias VD1-VD2 are included in a conductive structure 131 coupled between the front side metal routing, for example, the conductive lines 511 and 513, and the back side metal routing, for example, the back side conductive line 704. Alternatively stated, the conductive structure 131 included in the transmission unit (cell) 130 is configured to couple the back side metal routing to the front side metal routing.

Figure 7:
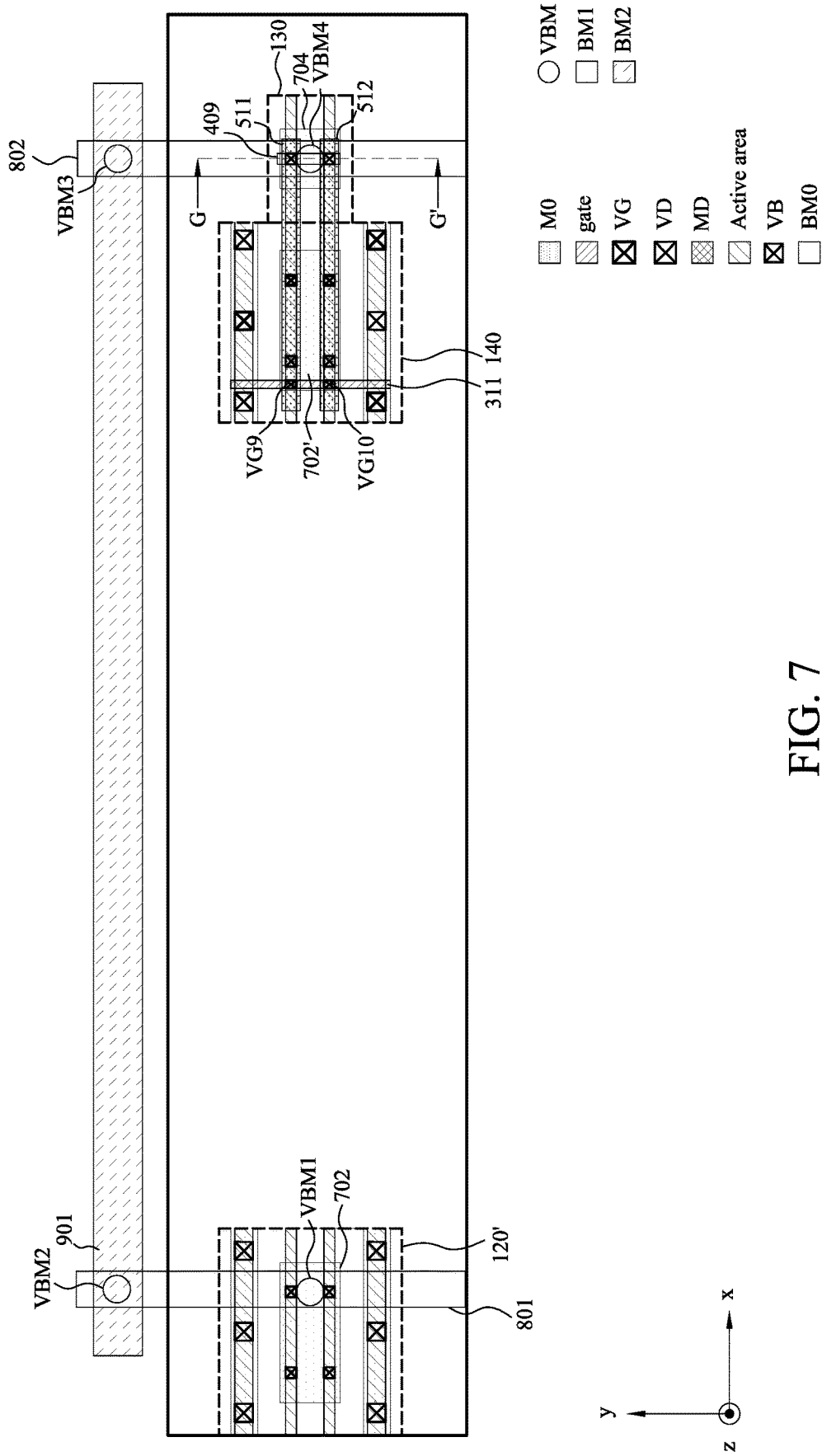
FIG. 7 is a layout diagram in a plain view of a section of the integrated circuit in FIG. 1, in accordance with some embodiments.

As aforementioned in FIG. 1, the driver circuit 120 is coupled to the transmission unit 130 through the back side metal routing to transmit the signal S2. The details of the transmission of the signal S2 is discussed with reference to FIG. 7. FIG. 7 is a layout diagram in a plain view of a section of the integrated circuit 10 in FIG. 1, in accordance with some embodiments. With respect to the embodiments of FIGS. 1, 2, 3A-3F, 4, 5A-5D, and 6A-6C, like elements in FIG. 7 are designated with the same reference numbers for ease of understanding.

For illustration, the integrated circuit 10 further includes back side conductive lines (for example, back side metal-one layers BM1) 801-802, a back side conductive trace (for example, back side metal-two layers BM2) 901, and vias VBM1-VBM4. In some embodiments, the back side conductive lines 801-802 are disposed in a second layer below the first layer on the back side of the integrated circuit 10 and extend in y direction. The back side conductive trace 901 is disposed in a third layer below the second layer on the back side of the integrated circuit 10 and extends in x direction. The via VBM1 and VBM4 are disposed between the first layer and the second layer on the back side, and the vias VBM2-VBM3 are disposed between the second layer and the third layer on the back side. In some embodiments, the via VBM1 couples the back side conductive line 702 to the back side conductive line 801. The back side conductive line 801 is coupled to the back side conductive trace 901 through the via VBM2 couple. The back side conductive trace 901 is coupled to the back side conductive line 802 through the via VBM3. The back side conductive line 802 is coupled to the back side conductive line 704 through the via VBM4.

In operation, the back side conductive line 702 as the output terminal of the driver circuit 120 transmits the signal S2 to the back side conductive line 704, as an input terminal of the transmission unit 130, through the via VBM1, the back side conductive line 801, the via VBM2, the back side conductive trace 901, the via VBM3, the back side conductive line 802, and the via VBM4. After receiving the signal S2 at the input terminal, the transmission unit 130 further outputs the signal S2 through the conductor 409 as the output terminal on the front side of the integrated circuit 10.

Moreover, the integrated circuit 10 further includes conductive lines (for example, the metal-zero layer, MO) 511-512 configured with respect to, for example, the conductive lines 503 and 507. In some embodiments, the receiver circuit 140 and the transmission unit 130 have the same configuration, and the receiver circuit 140 includes a gate 311 coupled with the conductive lines 511-512 by vias VG9 and VG10 to receive the signal S2 transmitted from the transmission unit 130 through the conductive lines 511-512. In some embodiments, a back side conductive line 702', configured with respect to the back side conductive line 702 in the driver circuit 120, is configured as an output terminal of the receiver circuit 140 to output the signal S3 associated with the signal S2 to an input terminal of other circuit, for example, the logic circuit 150.

In some approaches, resistivity of the signal path (e.g., through the front side metal routing) between the logic circuit 110 and the logic circuit 150 surges as dimensions of the signal path is scaled down. With the configurations of the present disclosure, by utilizing back side metal lines which have greater line widths for transmitting signals between logic circuits distance away from each other (e.g., the logic circuit 110 and the logic circuit 150 in FIG. 1), the signal path for transmitting the signal S2 has decreased resistivity and correspondingly the performance of the integrated circuit 10 optimized.

Figure 8:
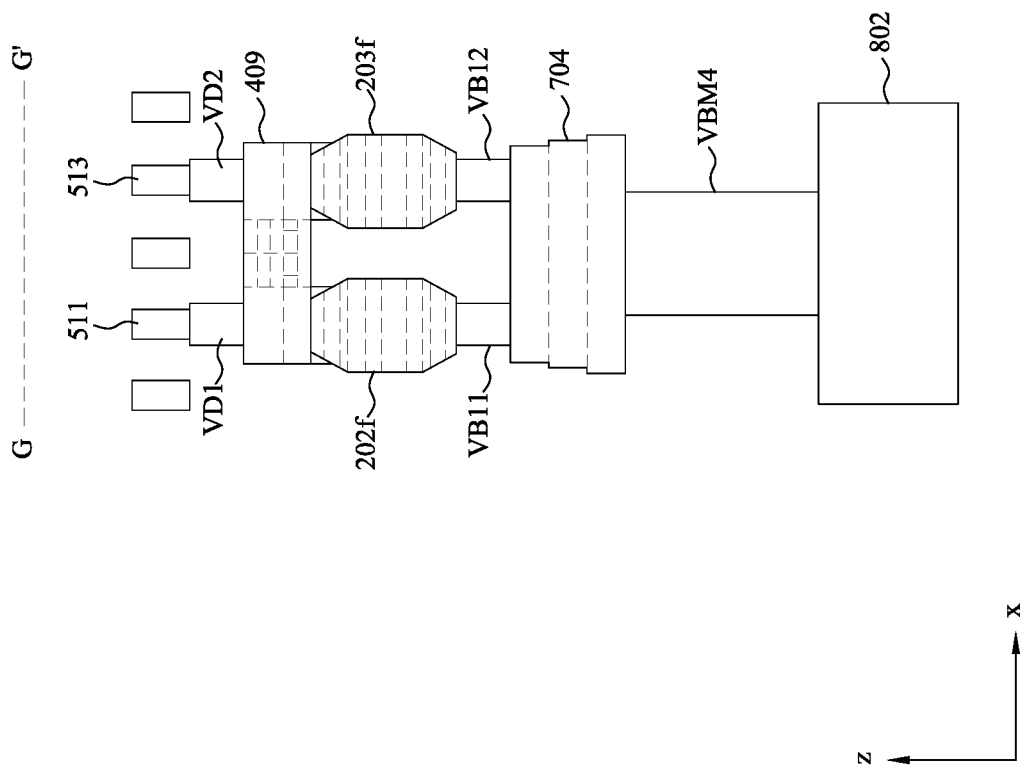
FIG. 8 is cross-sectional view of the layout diagram of the transmission unit in FIG. 7 along line GG', in accordance with some embodiments.

Reference is now made to FIG. 8. FIG. 8 is cross-sectional view of the layout diagram of the transmission unit 130 in FIG. 7 along line GG', in accordance with some embodiments. For illustration, the via VBM4 is disposed and coupled between the back side conductive line 704 and the back side conductive line 802 for transmitting the signal S2 to the conductive lines 511 and 513. Alternatively stated, the signal S2 is transmitted from the back side metal routing to the front side metal routing.

Figure 9:
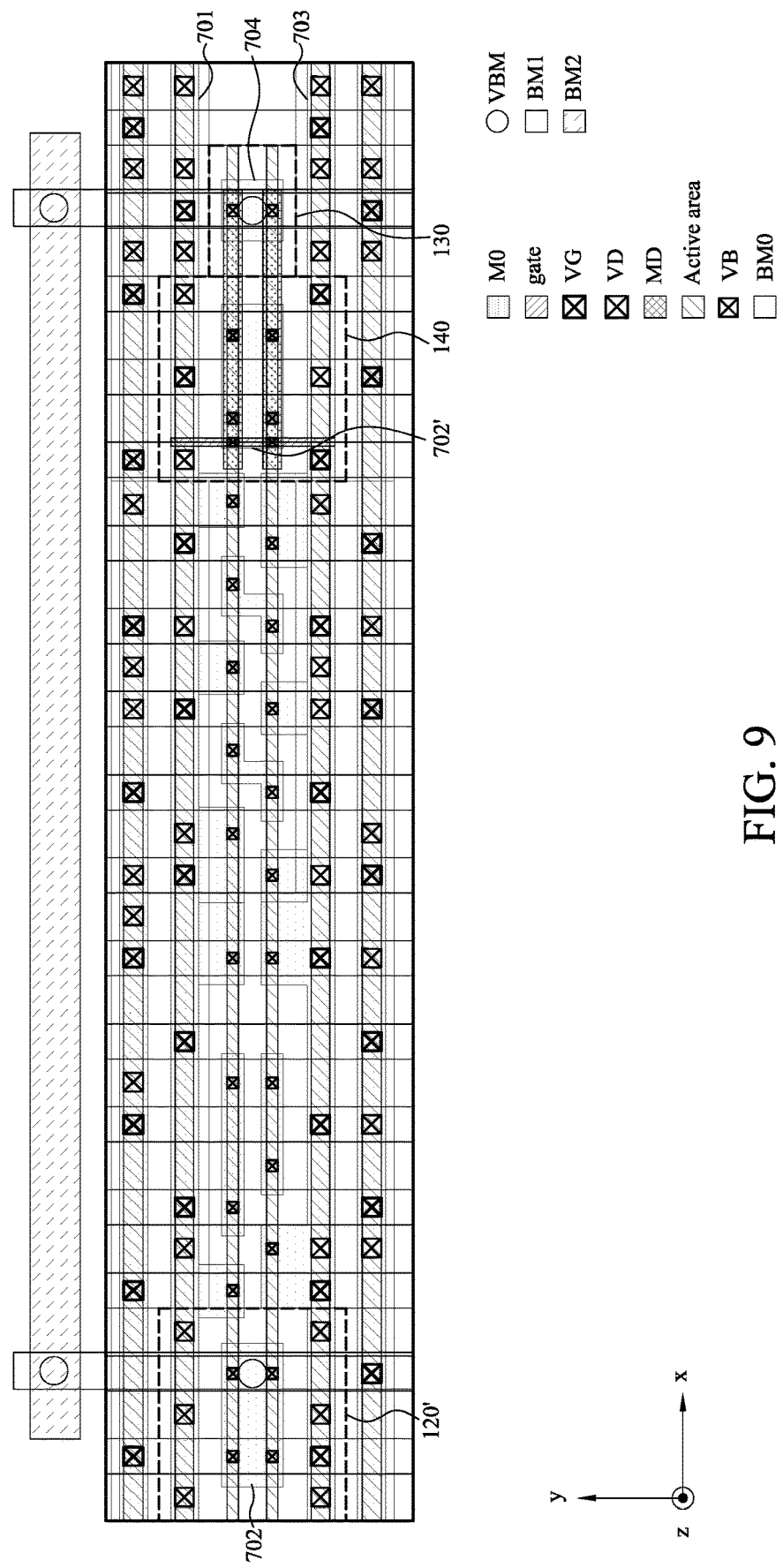
FIG. 9 is a layout diagram in a plain view of the section of the integrated circuit in FIG. 7, in accordance with some embodiments.

Reference is now made to FIG. 9. FIG. 9 is a layout diagram in a plain view of the section of the integrated circuit 10 in FIG. 7, in accordance with some embodiments. For illustration, the back side conductive lines 701 and 703 are shared by the driver circuit(cell) 120 and receiver circuit(cell) 140. The back side conductive lines 702 and 702' are arranged between the back side conductive lines 701 and 703. In the embodiments in FIG. 9, the transmission unit 130 is arranged between the back side conductive lines 701 and 703.

The configurations of FIGS. 6A-6C and 7-9 are given for illustrative purposes. Various implements are within the contemplated scope of the present disclosure. For example, in some embodiments, only one of the vias VD1-VD2 and only one of the vias VB11-VB12 are arranged to couple the back side metal line(s) to the front side metal line(s).

Figure 10:
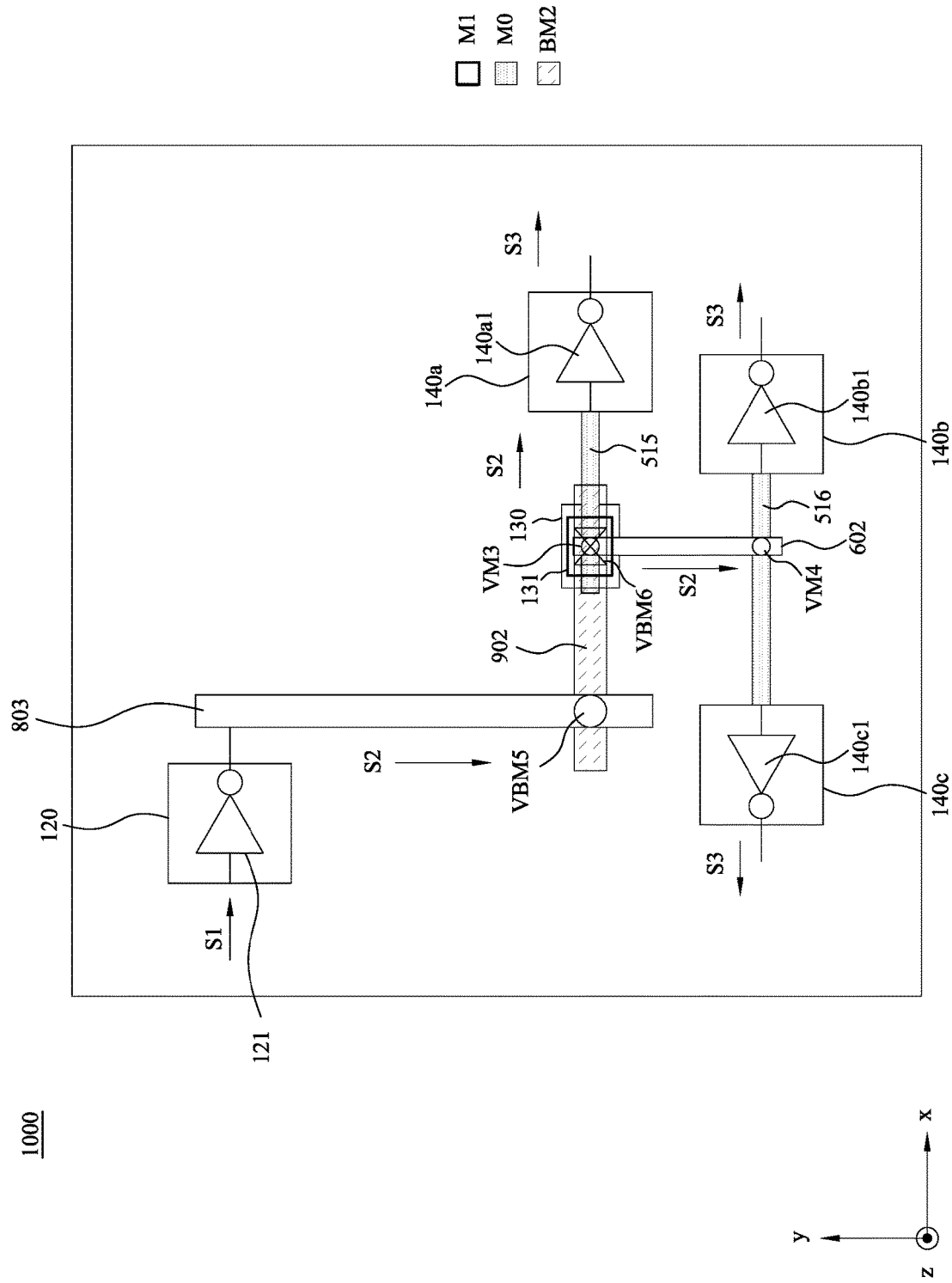
FIG. 10 is a schematic diagram of an integrated circuit, in accordance with some embodiments.

Reference is now made to FIG. 10. FIG. 10 is a schematic diagram of an integrated circuit 1000, in accordance with some embodiments. With respect to the embodiments of FIGS. 1, 2, 3A-3F, 4, 5A-5F, 6A-6C, and 7-9, like elements in FIG. 10 are designated with the same reference numbers for ease of understanding.

For illustration, the integrated circuit 1000 includes the driver circuit 120, a back side conductive line 803, a back side conductive trace 902, the transmission unit 130, conductive lines 515-516, a conductive trace 602, vias VBM5-VBM6, VM3-VM4, receiver circuits 140a-140c. In some embodiments, the back side conductive line 803 is configured with respect to, for example, the back side conductive line 802. The back side conductive trace 902 is configured with respect to, for example, the back side conductive trace 901. The conductive lines 515-516 are configured with respect to, for example, the conductive line 511. The conductive trace 602 is configured with respect to, for example, the conductive trace 601. The vias VBM5-VBM6 are configured with respect to, for example, the via VBM4, and the vias VM3-VM4 are configured with respect to, for example, the via VM2.

The back side conductive line 803 and the back side conductive trace 902 are disposed on the back side of the integrated circuit 1000, while the back side conductive line 803 extends in y direction over the back side conductive trace 902 that extends in x direction. The conductive lines 515-516 extend in x direction and are separated from each other in y direction. The conductive trace 602 extends in y direction and crosses over the conductive lines 515-516.

In some embodiments, the driver circuit 120 is configured to output the signal S2 and at least one of the receiver circuits 140a-140c is configured to receive the signal S2 through a conductive line coupled between the output terminal of the transmission unit 130 and the at least one of the receiver circuit 140a-140c that outputs the signal S3 associated with the signal S2 to the logic circuit(s) 150. The driver circuit 120 is configured with respect to, for example, the driver cell 120C or 120C'. The receiver circuits 140a-140c are referred to as receiver cells in the layout view as shown by the receiver circuit 140 of FIG. 7. The transmission unit 130 is configured with respect to, for example, the transmission cell 130C. In some embodiments, the aforementioned conductive line includes first portions including the conductive lines 515-516 and a second portion including the conductive trace 602.

Specifically, an output terminal of the driver circuit 120 is coupled to the back side conductive line 803 and the back side conductive line 803 is coupled to the back side conductive trace 902 through the via VBM5. The back side conductive trace 902 is coupled to the conductive structure 131 of the transmission unit 130 through the via VBM6. Compared with the conductive structure 131 coupled to the conductive lines 511 and 513 in FIG. 6C, the conductive structure 131 in FIG. 10 is coupled to the conductive line 515 that is coupled to the receiver circuit 140a. In addition, the conductive line 515 is coupled to an input terminal of the receiver circuit 140a and to the conductive trace 602 through the via VM3. The conductive trace 602 is coupled to the conductive line 516 through the via VM4. The conductive line 516 is coupled to input terminals of the receiver circuits 140b-140c. Accordingly, the signal S2 outputted by the driver circuit 120 is transmitted to the receiver circuits 140a-140c, and the receiver circuits 140a-140c output the signals S3, as illustratively shown in FIG. 10.

In some embodiments, the driver circuit 120 includes an inverter 121. Each of the receiver circuits 140a-140c includes one of inverters 140a1-140c1. In some embodiments, the inverters 121 and 140a1-140c1 have the configurations of that shown in FIGS. 2, 3A-3F, 4, and 5A-5D. In the embodiments of FIG. 10, the signal S2 is inverted from the signal S1, and the signal S3 is inverted from the signal S2. Accordingly, the signals S1 and S3 have the same logic value that is different from the one of the signal S2.

With the configurations of FIG. 10, the transmission unit (cell) 130 transmits the signal S2 received from the back side of the integrated circuit 1000 to multiple receiver circuits on the front side of the integrated circuit 1000, which provides feasibility of routing for transmitting the signal S2 to circuits on the front side of the integrated circuit 1000.

Figure 11:
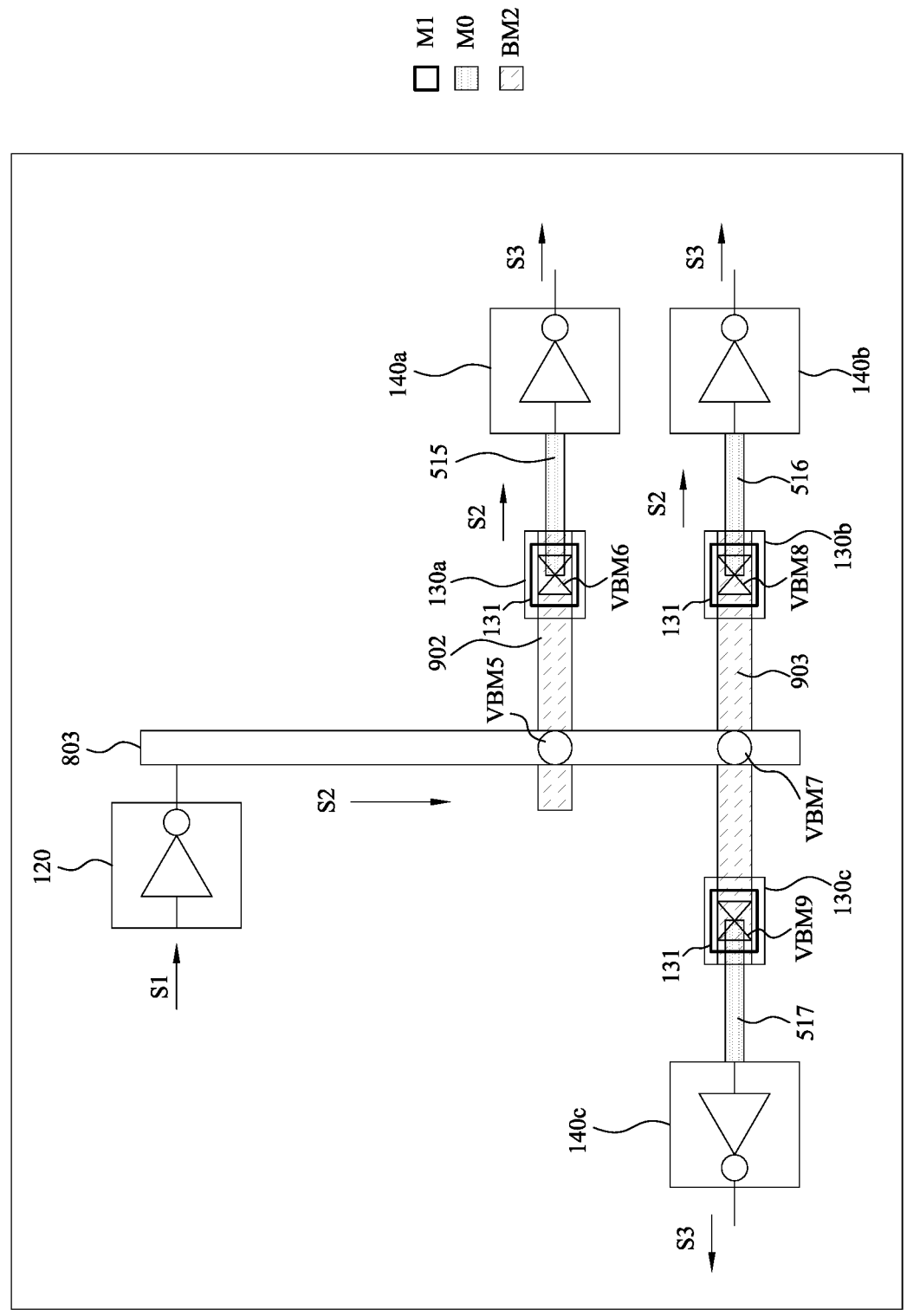
FIG. 11 is a schematic diagram of an integrated circuit, in accordance with some embodiments.

Reference is now made to FIG. 11. FIG. 11 is a schematic diagram of an integrated circuit 1100, in accordance with some embodiments. With respect to the embodiments of FIGS. 1, 2, 3A-3F, 4, 5A-5F, 6A-6C, and 7-10, like elements in FIG. 11 are designated with the same reference numbers for ease of understanding.

Compared with FIG. 10, the integrated circuit 1100 further includes a back side conductive trace 903, a conductive line 517, transmission units (cells) 130a-130c, and vias VBM7-VBM9. The transmission units 130a-130c are configured with respect to, for example, the transmission cell 130C. In some embodiments, the back side conductive trace 903 is configured with respect to, for example, the back side conductive trace 902. The conductive line 517 is configured with respect to, for example, the conductive line 516. The transmission units 130a-130c are configured with respect to, for example, the transmission unit 130 in FIG. 11. Each of the transmission units 130a-130c has the conductive structure 131 as an input terminal of the transmission unit. The vias VBM7-VBM9 are configured with respect to, for example, the via VBM6. For illustration, the back side conductive trace 903 extends in x direction under the back side conductive line 803. The conductive line 517 extends in x direction above the back side conductive trace 903.

Specifically, the back side conductive line 803 is coupled to the back side conductive traces 902-903 through the vias VBM5 and VBM7 respectively. The back side conductive trace 902 is coupled to the conductive structure 131 of the transmission unit 130a through the via VBM6. The back side conductive trace 903 is coupled to the conductive structures 131 of the transmission units 130b-130c through the vias VBM8-VBM9 respectively. The conductive structure 131 of the transmission unit 130b is coupled to the conductive line 516 that is coupled to the input terminal of the receiver circuit 140b. The conductive structure 131 of the transmission unit 130c is coupled to the conductive line 517 that is coupled to the input terminal of the receiver circuit 140c. Accordingly, the signal S2 outputted by the driver circuit 120 is transmitted to the receiver circuits 140a-140c, and the receiver circuits 140a-140c output the signals S3, as illustratively shown in FIG. 11.

Moreover, with the reference to FIGS. 7 and 11, each of the receiver circuits 140a-140c includes the gate 311 on the front side of the integrated circuit 1100 as the gate 311 in the receiver circuit 140 shown in FIG. 7. In some embodiments, the conductive lines 515-517 couple the conductors 409, included in the conductive structures 131 of the transmission units 130a-130c, to the gates 311 in the receiver circuits 140a-140c.

In some approaches, the signal between a driver circuit and a receiver circuit is transmitted in the front side metal lines. Compared with the approaches, in the embodiments of the present disclosure, the signal is transmitted in portions of the back side metal routing and in portions of the front side metal routing, in which metal lines on the back side for routing (e.g., the back side conductive line 803 and the back side conductive traces 902-903) have widths wider than that on the front side for routing (e.g., the conductive lines 515-517). Due to the wider width of metal lines on the back side in some embodiments, the signal experiences less resistance contributed from the metal routing, compared to some approaches. Accordingly, power consumption of the integrated circuits 1000 and 1100 is reduced.

The configurations of FIGS. 10-11 are given for illustrative purposes. Various implements are within the contemplated scope of the present disclosure. For example, in some embodiments, instead of having inverters in the driver circuit 120 and the receiver circuits 140a-140c, buffers and/or the combinations of inverters and buffers are included in those circuits.

Figure 12:
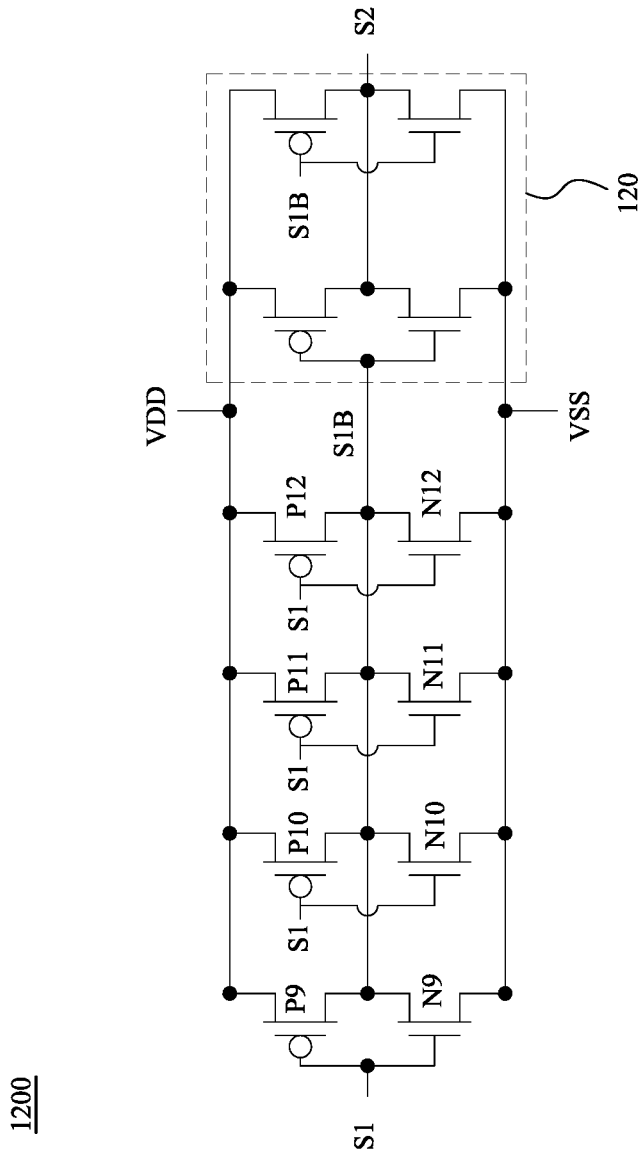
FIG. 12 is a schematic circuit diagram of a driver circuit in the integrated circuit of FIG. 1, in accordance with another embodiment.

Reference is now made to FIG. 12. FIG. 12 is a schematic circuit diagram of a driver circuit 1200 in the integrated circuit of FIG. 1, in accordance with another embodiment. With respect to the embodiments of FIGS. 1, 2, 3A-3F, 4, 5A-5F, 6A-6C, and 7-11, like elements in FIG. 12 are designated with the same reference numbers for ease of understanding.

Compared with the driver circuit 120 in FIG. 2, the driver circuit 1200 further includes P-type transistors P9-P12 and N-type transistors N9-N12. The transistors P9-P12 and N9-N12 are configured to operate as an inverter, and accordingly, by including portions of the driver circuit 120, the driver circuit 1200 is configured to operate as a buffer circuit.

For illustration, source terminals of the transistors P9-P12 are coupled to the supply voltage terminal VDD, and source terminals of the transistors N9-N12 are coupled to the supply voltage terminal VSS. Gates of the transistors P9-P12 and N9-N12 receive the signal S1. Drain terminals of the transistors P9-P12 and N9-N12 are coupled together to output a signal S1B to the gates of the transistors included in the driver circuit 120. The driver circuit 120 outputs the signal S2 at the drain terminals of the transistors included in the driver circuit 120. The signal S1B is inverted from the signal S1, and the signal S2 is inverted from the signal S1B. The signals S1-S2 have the same logic value which is different from that of the signal S1B.

Figure 13A:
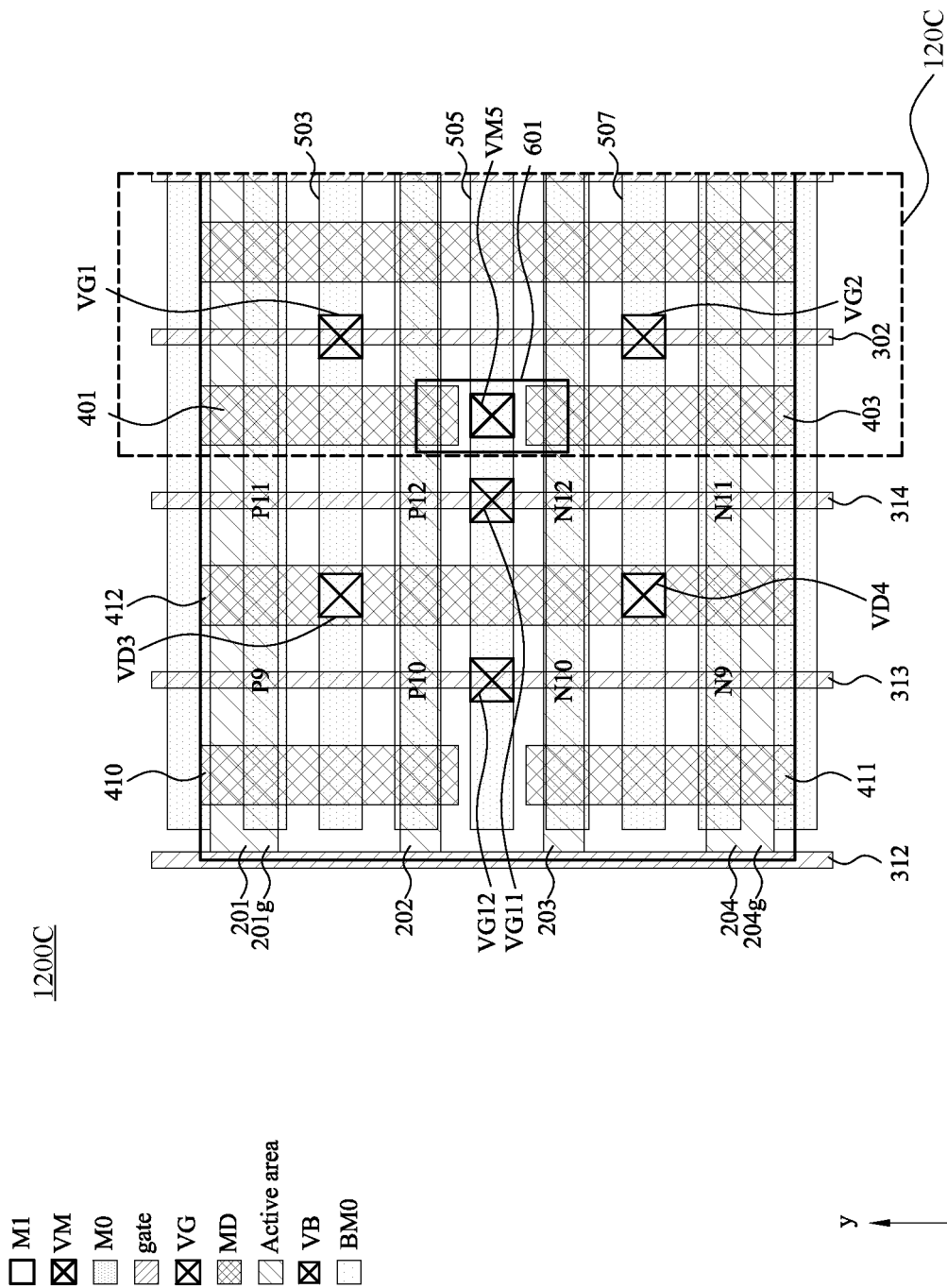
FIGS. 13A-13B are layout diagrams in a plan view of a section of the driver circuit in FIG. 12, in accordance with some embodiments.
Figure 13B:
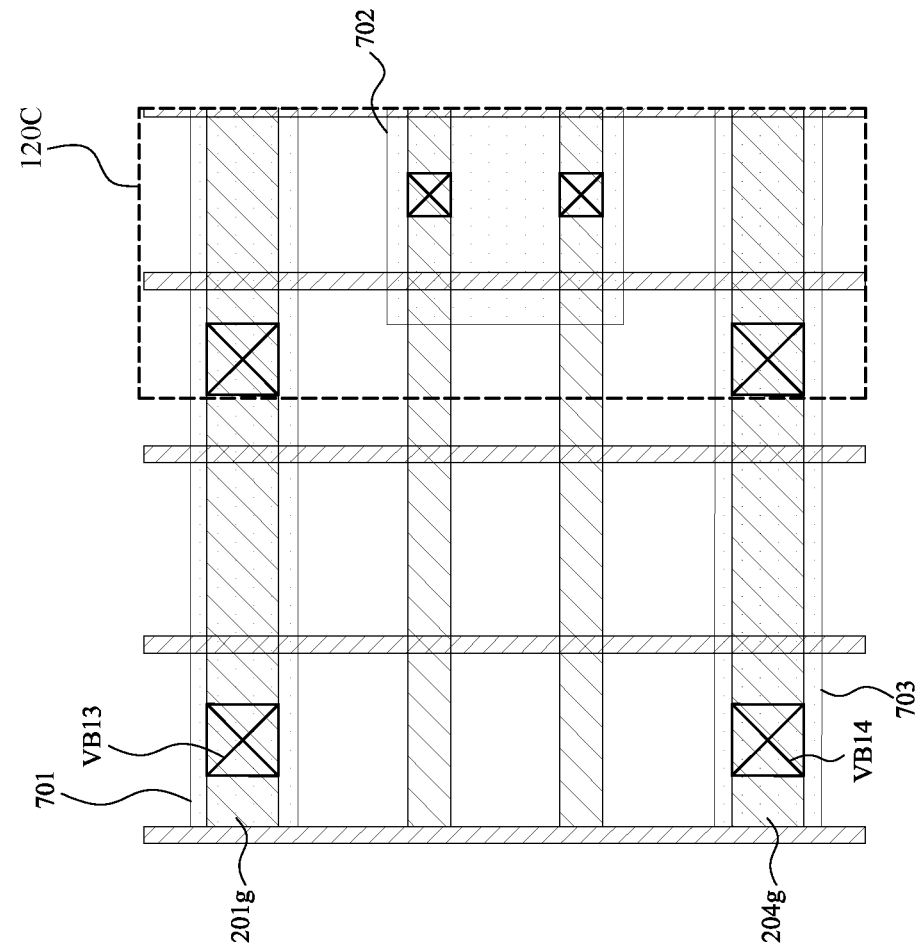

Reference is now made to FIGS. 13A-13B. FIGS. 13A-13B are layout diagrams in a plan view of a section of the driver circuit 1200 in FIG. 12, in accordance with some embodiments.

Compared with FIG. 3A, the driver cell 1200° C. further includes gates 312-314, conductors 410-412, and vias VM5, VD3-VD4, and VG11-VG12. In some embodiments, the gates 312-314 are configured with respect to, for example, the gate 302. The conductors 410-412 are configured with respect to, for example, the conductor 402. The via VM5 is configured with respect to, for example, the via VM1. The vias VG11-VG12 is configured with respect to, for example, the via VG1. The vias VD3-VD4 are configured with respect to, for example, the via VD1.

In some embodiments, the gate 313 corresponds to the gate terminals of the transistors P9-P10 and N9-N10, and the gate 314 corresponds to the gate terminals of the transistors P11-P12 and N11-N12. The conductor 410 corresponds to the source terminals of the transistors P9-P10. The conductor 411 corresponds to the source terminals of the transistors N9-N10. The conductor 412 corresponds to the drain terminals of the transistors P9-P12 and N9-N12. The conductor 401 corresponds to the source terminals of the transistors P11-P12. The conductor 403 corresponds to the source terminals of the transistors N11-N12.

As illustratively shown in FIG. 13A, the conductive trace 601 is coupled to the conductive line 505 through the via VM5. The conductive line 505 is further coupled to the gates 313-314. Accordingly, the signal S1 is received by the conductive trace 601 for the driver circuit 1200 and transmitted to the gate terminals of the transistors P9-P12 and N9-N12. The via VD3 couples the conductor 412 to the conductive line 503, and the via VD4 couples the conductor 412 to the conductive line 507. The conductive lines 503 and 507 are coupled to the gate 302 through the vias VG1-VG2. Accordingly, the signal S1B outputted from the conductor 412 as the drain terminals of the transistors P9-P12 and N9-N12 is transmitted to the gate 302.

In FIG. 13B, the via VB13 couples the back side conductive line 701 to an active region 201g, of the active area 201, that is included in the structure as the source terminal of the transistor P9. Similarly, the via VB14 couples the back side conductive line 703 to an active region 204g, of the active area 204, that is included in the structure as the source terminal of the transistor N9.

In operation, the driver circuit 1200 outputs the signal S2 through the back side conductive line 702 on the back side of the integrated circuit 10.

Figure 14:
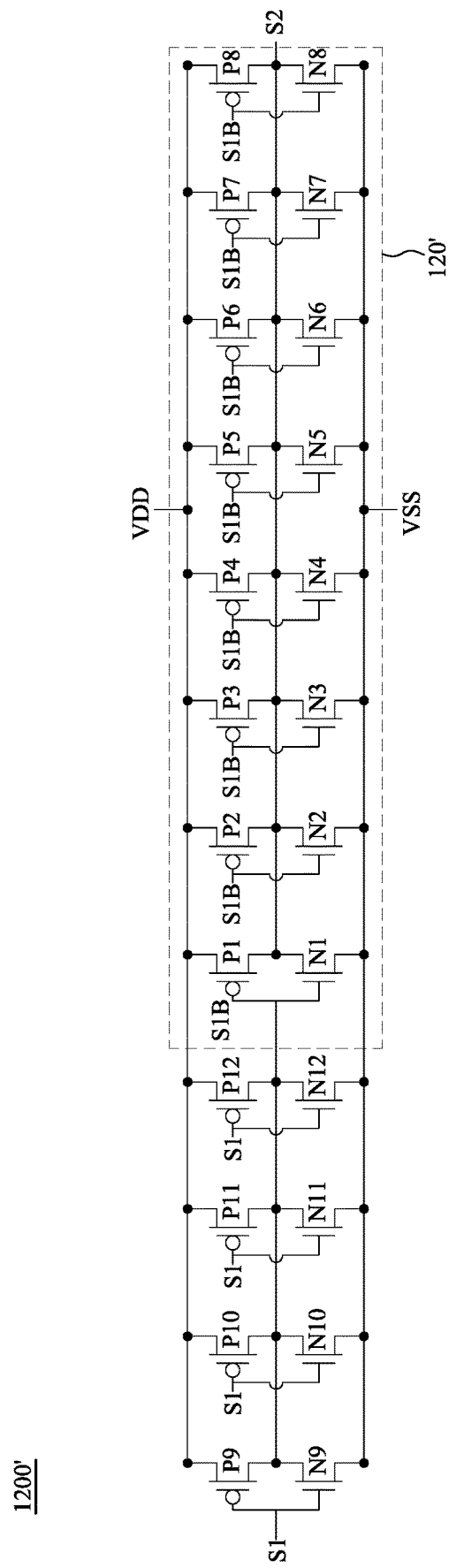
FIG. 14 is a schematic circuit diagram of a driver circuit in the integrated circuit of FIG. 1, in accordance with another embodiment.

Reference is now made to FIG. 14. FIG. 14 is a schematic circuit diagram of a driver circuit 1200' in the integrated circuit of FIG. 1, in accordance with another embodiment. With respect to the embodiments of FIGS. 1-13B, like elements in FIG. 14 are designated with the same reference numbers for ease of understanding.

Compared with FIG. 12, instead of having the driver circuit 120 in the driver circuit 1200, the driver circuit 1200' in FIG. 14 includes the driver circuit 120' in FIG. 4. In operation, the signal S1 is received by the gate terminals of the transistors P9-P12 and N9-N12, and the signal S1B outputted from the drain terminals of the transistors P9-P12 and N9-N12 are inputted into the gate terminals of the transistors in the driver circuit 120'.

Reference is now made to FIGS. 15A-15B. FIGS. 15A-15B are layout diagrams in a plan view of a section of the driver circuit 1200' in FIG. 14, in accordance with some embodiments.

Compared with the driver cell 120' in FIG. 5A, instead of transmitting the signal S1 from the conductive trace 601 to the gate 301, the conductive trace 601 is coupled to the conductive line 505 to transmit the signal S1 to the gates of the transistors P9-P12 and N9-N12, as shown in the driver cell 1200'C of FIG. 15A.

In FIG. 15B, during the operation, the driver circuit 1200' is configured to output the signal S2 through the back side conductive line 702.

The configurations of FIGS. 12, 13A, 13B, 14, and 15A-15B are given for illustrative purposes. Various implements are within the contemplated scope of the present disclosure. For example, in some embodiments, the receiver circuit 140 in FIG. 1 has the configuration the same that of the driver circuit 1200 or 1200' shown in FIGS. 12, 13A, 13B, 14, and 15A-15B and operates as a buffer circuit.

Figure 16:
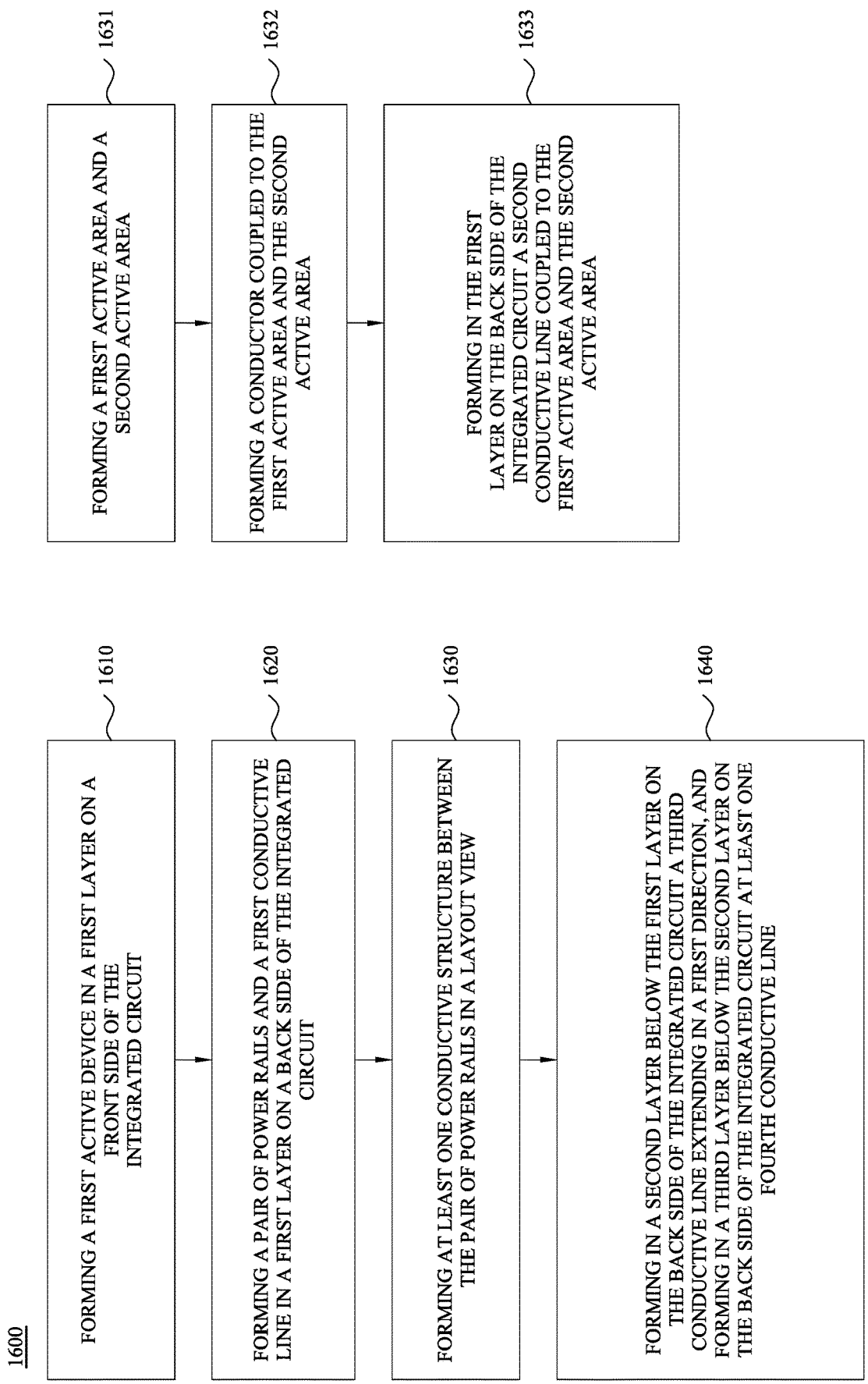
FIG. 16 is a flow chart of manufacturing an integrated circuit, in accordance with some embodiments.

Reference is now made to FIG. 16. FIG. 16 is a flow chart of manufacturing the integrated circuit 10, 1000, or 1100, in accordance with some embodiments. It is understood that additional operations can be provided before, during, and after the processes shown by FIG. 16, and some of the operations described below can be replaced or eliminated, for additional embodiments of the method. The order of the operations/processes may be interchangeable. Throughout the various views and illustrative embodiments, like reference numbers are used to designate like elements. The method 1600 includes operations 1610-1640 that are described below with reference to the integrated circuit 10 in FIGS. 1-9, the integrated circuit 1000 in FIG. 10, and the integrated circuit 1100 in FIG. 11.

In operation 1610, the driver circuit 120 as an active device is formed in a first layer on the front side of the integrated circuit 10.

In operation 1620, the pair of power rails 701, 703 and the back side conductive line 702 are formed on the back side of the integrated circuit 10. In some embodiments, the driver circuit 120 is coupled to the back side conductive line 702 to output the signal S2. In some embodiments, the back side conductive line 702 is included in the driver cell 120C in the layout view, as shown in FIG. 3B.

In operation 1630, the conductive structure 131 is formed between the pair of power rails 701, 703 in the layout view, as shown in FIG. 9.

In some embodiments, the operation 1630 further includes operations 1631-1633.

In the operation 1631, as shown in FIG. 6B, the active areas 202' and 203' are formed on the front side of the integrated circuit 10. In operation 1632, as shown in FIG. 6C, the conductor 409 is formed to couple the active areas 202' and 203' with each other. In operation 1633, the back side conductive line 704 is formed in the first layer on the back side of the integrated circuit 10 to be coupled to the active areas 202' and 203'.

In operation 1640, as shown in FIG. 7, the back side conductive line 801 is formed in a second layer below the first layer on the back side of the integrated circuit 10 and extends in y direction. In addition, the back side conductive trace 901 is formed in a third layer below the second layer on the back side of the integrated circuit 10 and extends in x direction. As illustratively shown in FIG. 7, the back side conductive line 801 and the back side conductive trace 901 are coupled between the back side conductive line 702 and the back side conductive line 704 to transmit the signal S2 from the driver circuit 120 to the conductive structure 131 of the transmission unit 130.

In some embodiments, as shown in FIG. 7, the receiver circuit 140 as a second active device in formed in the first layer on the front side of the integrated circuit 10. One of the conductive lines 511-512 is formed in a second layer above the first layer on the front side of the integrated circuit 10 to couple the receiver circuit 140 to the conductor 409 of the conductive structure 131 in the transmission unit 130. The back side conductive line 702' is formed in the first layer on the back side of the integrated circuit. In some embodiments, the receiver circuit 140 is coupled to the back side conductive line 702' to output the signal S3 corresponding to the signal S2 received from the conductive structure 131.

In some embodiments, as shown in FIG. 10, the method 1600_further includes operations of forming the receiver circuits 140a-140c in the first layer on the front side of the integrated circuit 1000, forming the conductive lines 515-516 in a second layer above the first layer on the front side of the integrated circuit 1000, and forming the conductive trace 602 in a third layer above the second layer on the front side of the integrated circuit to couple the conductive lines 515-516 to each other. In some embodiments, each of the receiver circuits 140a-140c is coupled to the driver circuit 120 through the back side conductive line 803, the conductive structure 131 of the transmission unit 130, the back side conductive trace 902 and one of the conductive lines 515-516.

In some embodiments, as shown in FIG. 11, the integrated circuit 1100 includes multiple transmission units 130 having the conductive structures 131 and the back side conductive traces 902-903. The method 1600 further includes operations of forming the receiver circuits 140a-140c in the first layer on the front side of the integrated circuit 1100 and forming the conductive lines 515-517 in a second layer above the first layer on the front side of the integrated circuit 1100. In FIG. 11, each of the receiver circuits 140a-140c is coupled to the driver circuit 120 through the back side conductive line 803, one of the back side conductive traces 902-903, one of the transmission units 130a-130c, and one of the conductive lines 515-517.

Figure 17:
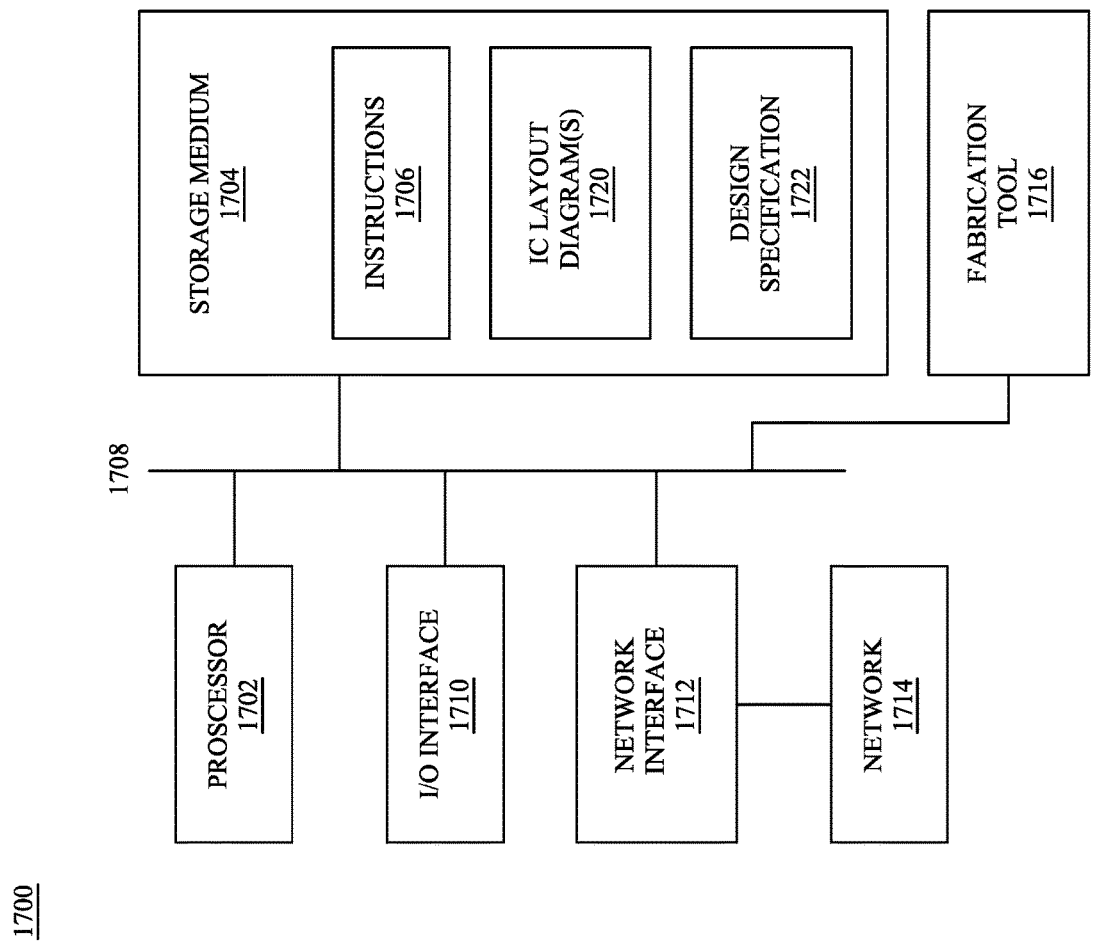
FIG. 17 is a block diagram of a system for designing the integrated circuit layout design, in accordance with some embodiments of the present disclosure.

Reference is now made to FIG. 17. FIG. 17 is a block diagram of an electronic design automation (EDA) system 1700 for designing the integrated circuit layout design, in accordance with some embodiments of the present disclosure. EDA system 1700 is configured to implement one or more operations of the method 1600 disclosed in FIG. 16, and further explained in conjunction with FIGS. 1, 2, 3A-3F, 4, 5A-5F, 6A-6C. and 7-9. In some embodiments, EDA system 1700 includes an APR system.

In some embodiments, EDA system 1700 is a general purpose computing device including a hardware processor 1702 and a non-transitory, computer-readable storage medium 1704. Storage medium 1704, amongst other things, is encoded with, i.e., stores, computer program code (instructions) 1706, i.e., a set of executable instructions. Execution of instructions 1706 by hardware processor 1702 represents (at least in part) an EDA tool which implements a portion or all of, e.g., the method 1600.

The processor 1702 is electrically coupled to computer-readable storage medium 1704 via a bus 1708. The processor 1702 is also electrically coupled to an I/O interface 1710 and a fabrication tool 1716 by bus 1708. A network interface 1712 is also electrically connected to processor 1702 via bus 1708. Network interface 1712 is connected to a network 1714, so that processor 1702 and computer-readable storage medium 1704 are capable of connecting to external elements via network 1714. The processor 1702 is configured to execute computer program code 1706 encoded in computer-readable storage medium 1704 in order to cause EDA system 1700 to be usable for performing a portion or all of the noted processes and/or methods. In one or more embodiments, processor 1702 is a central processing unit (CPU), a multi-processor, a distributed processing system, an application specific integrated circuit (ASIC), and/or a suitable processing unit.

In one or more embodiments, computer-readable storage medium 1704 is an electronic, magnetic, optical, electromagnetic, infrared, and/or a semiconductor system (or apparatus or device). For example, computer-readable storage medium 1704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1704 includes a compact disk-read only memory (CD-ROM), a compact disk-read/write (CD-R/W), and/or a digital video disc (DVD).

In one or more embodiments, storage medium 1704 stores computer program code 1706 configured to cause EDA system 1700 (where such execution represents (at least in part) the EDA tool) to be usable for performing a portion or all of the noted processes and/or methods. In one or more embodiments, storage medium 1704 also stores information which facilitates performing a portion or all of the noted processes and/or methods. In one or more embodiments, storage medium 1704 stores IC layout diagram 1720 of standard cells including such standard cells as disclosed herein, for example, a cell including in the integrated circuit 10, 1000 and/or 1100 discussed above with respect to FIGS. 1-15B.

EDA system 1700 includes I/O interface 1710. I/O interface 1710 is coupled to external circuitry. In one or more embodiments, I/O interface 1710 includes a keyboard, keypad, mouse, trackball, trackpad, touchscreen, and/or cursor direction keys for communicating information and commands to processor 1702.

EDA system 1700 also includes network interface 1712 coupled to processor 1702. Network interface 1712 allows EDA system 1700 to communicate with network 1714, to which one or more other computer systems are connected. Network interface 1712 includes wireless network interfaces such as BLUETOOTH, WIFI, WIMAX, GPRS, or WCDMA; or wired network interfaces such as ETHERNET, USB, or IEEE-1764. In one or more embodiments, a portion or all of noted processes and/or methods, is implemented in two or more systems 1700.

EDA system 1700 also includes the fabrication tool 1716 coupled to processor 1702. The fabrication tool 1716 is configured to fabricate integrated circuits, e.g., the integrated circuit 10, 1000 and/or 1100 illustrated in FIGS. 1-15B, according to the design files processed by the processor 1702.

EDA system 1700 is configured to receive information through I/O interface 1710. The information received through I/O interface 1710 includes one or more of instructions, data, design rules, libraries of standard cells, and/or other parameters for processing by processor 1702. The information is transferred to processor 1702 via bus 1708.

EDA system 1700 is configured to receive information related to a UI through I/O interface 1710. The information is stored in computer-readable medium 1704 as design specification 1722.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, for example, one or more of an optical disk, such as a DVD, a magnetic disk, such as a hard disk, a semiconductor memory, such as a ROM, a RAM, a memory card, and the like.

Figure 18:
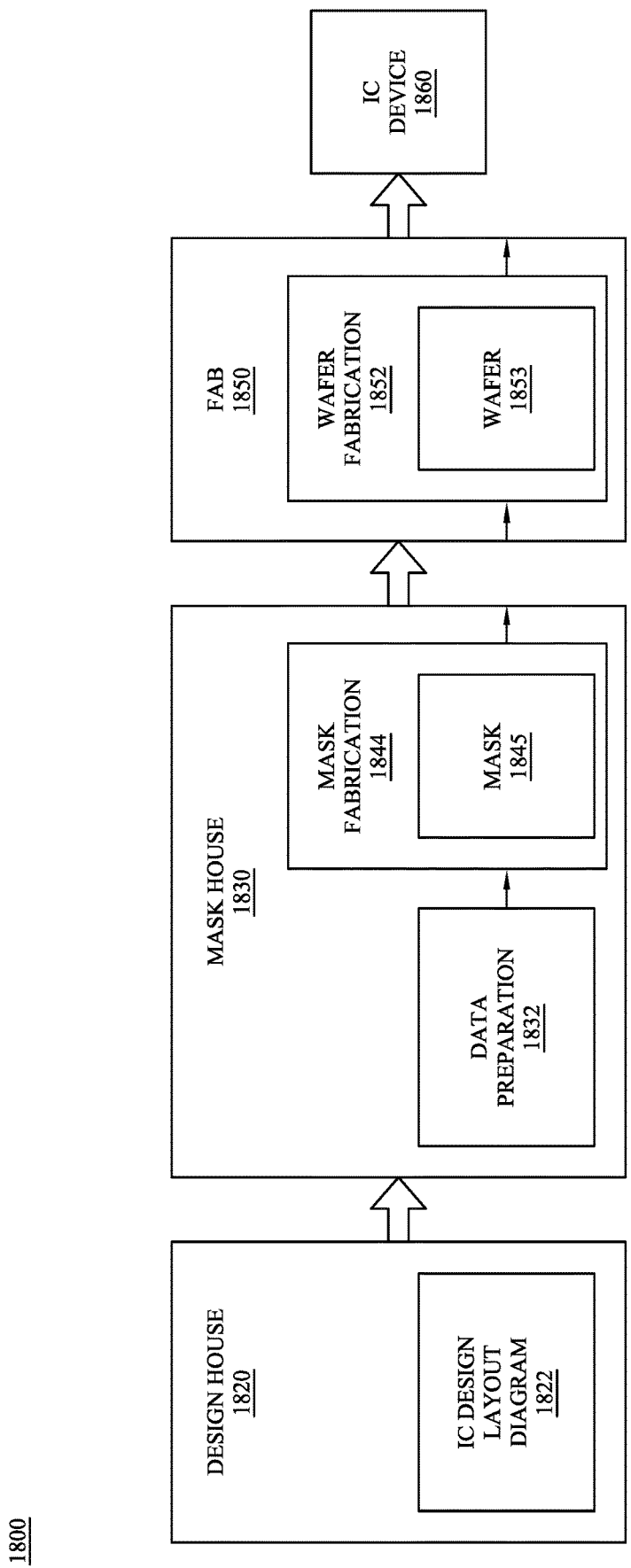
FIG. 18 is a block diagram of an integrated circuit manufacturing system, and an integrated circuit manufacturing flow associated therewith, in accordance with some embodiments.

FIG. 18 is a block diagram of IC manufacturing system 1800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using IC manufacturing system 1800.

In FIG. 18, IC manufacturing system 1800 includes entities, such as a design house 1820, a mask house 1830, and an IC manufacturer/fabricator ("fab") 1850, that interact with one another in the design, development, and manufacturing cycles and/or services related to manufacturing an IC device 1860. The entities in IC manufacturing system 1800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1820, mask house 1830, and IC fab 1850 is owned by a single larger company. In some embodiments, two or more of design house 1820, mask house 1830, and IC fab 1850 coexist in a common facility and use common resources.

Design house (or design team) 1820 generates an IC design layout diagram 1822. IC design layout diagram 1822 includes various geometrical patterns, for example, an IC layout design depicted in FIGS. 1-15B, designed for an IC device 1860, for example, the integrated circuit 10, 1000, and 1100 discussed above with respect to FIGS. 1-15B. The geometrical patterns correspond to patterns of metal, oxide, or semiconductor layers that make up the various components of IC device 1860 to be fabricated. The various layers combine to form various IC features. For example, a portion of IC design layout diagram 1822 includes various IC features, such as an active region, gate electrode, source and drain, conductive segments or vias of an interlayer interconnection, to be formed in a semiconductor substrate (such as a silicon wafer) and various material layers disposed on the semiconductor substrate. Design house 1820 implements a proper design procedure to form IC design layout diagram 1822. The design procedure includes one or more of logic design, physical design or place and route. IC design layout diagram 1822 is presented in one or more data files having information of the geometrical patterns. For example, IC design layout diagram 1822 can be expressed in a GDSII file format or DFII file format.

Mask house 1830 includes data preparation 1832 and mask fabrication 1844. Mask house 1830 uses IC design layout diagram 1822 to manufacture one or more masks 1845 to be used for fabricating the various layers of IC device 1860 according to IC design layout diagram 1822. Mask house 1830 performs mask data preparation 1832, where IC design layout diagram 1822 is translated into a representative data file ("RDF"). Mask data preparation 1832 provides the RDF to mask fabrication 1844. Mask fabrication 1844 includes a mask writer. A mask writer converts the RDF to an image on a substrate, such as a mask (reticle) 1845 or a semiconductor wafer 1853. The IC design layout diagram 1822 is manipulated by mask data preparation 1832 to comply with particular characteristics of the mask writer and/or requirements of IC fab 1850. In FIG. 18, data preparation 1832 and mask fabrication 1844 are illustrated as separate elements. In some embodiments, data preparation 1832 and mask fabrication 1844 can be collectively referred to as mask data preparation.

In some embodiments, data preparation 1832 includes optical proximity correction (OPC) which uses lithography enhancement techniques to compensate for image errors, such as those that can arise from diffraction, interference, other process effects and the like. OPC adjusts IC design layout diagram 1822. In some embodiments, data preparation 1832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, data preparation 1832 includes a mask rule checker (MRC) that checks the IC design layout diagram 1822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1822 to compensate for limitations during mask fabrication 1844, which may undo part of the modifications performed by OPC in order to meet mask creation rules.

In some embodiments, data preparation 1832 includes lithography process checking (LPC) that simulates processing that will be implemented by IC fab 1850 to fabricate IC device 1860. LPC simulates this processing based on IC design layout diagram 1822 to create a simulated manufactured device, such as IC device 1860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1822.

It should be understood that the above description of data preparation 1832 has been simplified for the purposes of clarity. In some embodiments, data preparation 1832 includes additional features such as a logic operation (LOP) to modify the IC design layout diagram 1822 according to manufacturing rules. Additionally, the processes applied to IC design layout diagram 1822 during data preparation 1832 may be executed in a variety of different orders.

After data preparation 1832 and during mask fabrication 1844, a mask 1845 or a group of masks 1845 are fabricated based on the modified IC design layout diagram 1822. In some embodiments, mask fabrication 1844 includes performing one or more lithographic exposures based on IC design layout diagram 1822. In some embodiments, an electron-beam (e-beam) or a mechanism of multiple e-beams is used to form a pattern on a mask (photomask or reticle) 1845 based on the modified IC design layout diagram 1822. Mask 1845 can be formed in various technologies. In some embodiments, mask 1845 is formed using binary technology. In some embodiments, a mask pattern includes opaque regions and transparent regions. A radiation beam, such as an ultraviolet (UV) beam, used to expose the image sensitive material layer (for example, photoresist) which has been coated on a wafer, is blocked by the opaque region and transmits through the transparent regions. In one example, a binary mask version of mask 1845 includes a transparent substrate (for example, fused quartz) and an opaque material (for example, chromium) coated in the opaque regions of the binary mask. In another example, mask 1845 is formed using a phase shift technology. In a phase shift mask (PSM) version of mask 1845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1844 is used in a variety of processes. For example, such a mask(s) is used in an ion implantation process to form various doped regions in semiconductor wafer 1853, in an etching process to form various etching regions in semiconductor wafer 1853, and/or in other suitable processes.

IC fab 1850 includes wafer fabrication 1852. IC fab 1850 is an IC fabrication business that includes one or more manufacturing facilities for the fabrication of a variety of different IC products. In some embodiments, IC Fab 1850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1850 uses mask(s) 1845 fabricated by mask house 1830 to fabricate IC device 1860. Thus, IC fab 1850 at least indirectly uses IC design layout diagram 1822 to fabricate IC device 1860. In some embodiments, semiconductor wafer 1853 is fabricated by IC fab 1850 using mask(s) 1845 to form IC device 1860. In some embodiments, the IC fabrication includes performing one or more lithographic exposures based at least indirectly on IC design layout diagram 1822. Semiconductor wafer 1853 includes a silicon substrate or other proper substrate having material layers formed thereon. Semiconductor wafer 1853 further includes one or more of various doped regions, dielectric features, multilevel interconnects, and the like (formed at subsequent manufacturing steps).

As described above, the present disclosure provides an integrated circuit including logic circuits to transmit logic signals both in the front side metal routing and the back side metal routing of the integrated circuit. By utilizing metal lines having greater width on the back side for long-distance signal transmission, less resistance is experienced by the signal, compared with some approaches. Accordingly, the performance, such like the operation speed, is improved.

In some embodiments, an integrated circuit is disclosed, including a driver cell having a first cell height and at least one transmission cell having a second cell height different from the first cell height. The driver cell includes a first active area, a second active area, and a first conductive line. The first active area and the second active area extend in a first direction on a front side of the integrated circuit. The first conductive line extends in the first direction on a back side of the integrated circuit, and is coupled to the first active area and the second active area through a first via and a second via respectively. The at least one transmission cell includes a third active area and a fourth active area, a second conductive line, and a conductor. The third active area and the fourth active area extend in the first direction on the front side of the integrated circuit. The second conductive line extends in the first direction on the back side of the integrated circuit, and is coupled to the third active area and the fourth active area through a third via and a fourth via respectively. The conductor crosses over and is coupled to the third active area and the fourth active area. The integrated circuit further includes a third conductive line on the back side of the integrated circuit coupled between the first conductive line and the second conductive line to transmit a signal between the driver cell and the at least one transmission cell.

In some embodiments, the first cell height is twice as long as the second cell height.

In some embodiments, the first conductive line is further coupled to the first active area and the second active area through a fifth via and a sixth via respectively, wherein the first via and the second via are separated from the fifth via and sixth via along the first direction.

In some embodiments, the second conductive line has a length, along the first direction, that is greater than a poly pitch of the at least one transmission cell.

In some embodiments, the integrated circuit further includes a pair of power rails that extend in a first direction on the back side of the integrated circuit. The first conductive line and the second conductive line are arranged interposed between the pair of power rails.

In some embodiments, the driver cell further includes a fifth active area and a sixth active area on the front side of the integrated circuit. Each of the fifth active area and the sixth active area is coupled to one rail of the pair of power rails. Along a second direction different from the first direction, the fifth active area and the sixth active area have a width greater than a width of the third active area and the fourth active in the at least one transmission cell.

In some embodiments, the at least one transmission cell includes multiple transmission cells. The integrated circuit further includes multiple receiver cells and multiple fourth conductive lines. Each of the receiver cells has at least one gate on the front side of the integrated circuit. The fourth conductive lines extend above the conductors of the transmission cells, and configured to couple the conductors of the transmission cells to the gates of the receiver cells.

In some embodiments, the third conductive line includes a first portion and multiple second portions. The first portion extends in the first direction in a first layer to couple the first conductive line of the driver cell. The second portions extend in a second direction different from the first direction in a second layer different from the first layer to couple to the second conductive lines of the transmission cells.

In some embodiments, the at least transmission cell further includes at least one fifth via coupled to between the conductor and a fourth conductive line extending on the front side of the integrated circuit in the first direction. The integrated circuit includes a fifth conductive line, a sixth conductive line, and multiple receiver cells. The fifth conductive line extends in the first direction on the front side of the integrated circuit. The sixth conductive line extends in a second direction different from the first direction on the front side of the integrated circuit and coupled to the fourth conductive line and fifth conductive line. The receiver cells are coupled to one of the fourth conductive line and the fifth conductive line in order to receive the signal transmitted from the at least one transmission cell.

Also disclosed is an integrated circuit, including a driver circuit, at least one transmission unit, and at least one receiver circuit. The driver circuit receives a first signal from a first logic circuit through a first conductive line on a front side of an integrated circuit, and outputs a second signal associated with the first signal through a second conductive line on a back side of the integrated circuit. The at least one transmission unit receives the second signal at an input terminal, on the back side of the integrated circuit, coupled to the second conductive line, and outputs the second signal at an output terminal on the front side of the integrated circuit. The at least one receiver circuit receives the second signal through a third conductive line, coupled between the output terminal of the at least one transmission unit and the at least one receiver circuit, on the front side of the integrated circuit, and outputs a third signal associated with the second signal to a second logic circuit.

In some embodiments, the integrated circuit further includes a fourth conductive line. The fourth conductive line is arranged on the back side of the integrated circuit. The fourth conductive line is coupled between an output terminal, on the back side of the integrated circuit, of the at least one receiver circuit and an input terminal of the second logic circuit to transmit the third signal.

In some embodiments, the at least one receiver circuit includes multiple receiver circuits. The third conductive line includes multiple first portions in a first layer and a second portion in a second layer above the first layer. The first portions are coupled between the output terminal of the at least one transmission circuit and input terminals of the receiver circuits, and the second portion is coupled between at least two of the first portions.

In some embodiments, the at least one receiver circuit includes multiple receiver circuits, and the at least one transmission unit includes multiple transmission units. The second conductive line includes a first portion in a first layer and multiple second portions in a second layer different from the first layer. The first portion is coupled between an output terminal, on the back side of the integrated circuit, of the driver circuit and the second portions, and each of the second portions is coupled between the first portion and the input terminal of one of the transmission units.

In some embodiments, the driver circuit includes at least one inverter. The at least one inverter includes a first transistor and a second transistor. The first transistor includes a first active region, on the front side of the integrated circuit, included in a structure as a drain terminal of the first transistor, and the second transistor includes a second active region, on the front side of the integrated circuit, included in a structure as a drain terminal of the second transistor. The first active region and the second active region are coupled with each other through the second conductive line.

In some embodiments, the at least one inverter receives a first supply voltage and a second supply voltage by a pair of power rails on the back side of the integrated circuit. The second conductive line is arranged between the pair of the power rails.

Also disclosed is a method, including operations of forming a first active device in a first layer on a front side of the integrated circuit, forming a pair of power rails and a first conductive line in a first layer on a back side of the integrated circuit, wherein the first active device is coupled to the first conductive line to output a first signal, and forming at least one conductive structure between the pair of power rails in a layout view. The forming the at least one conductive structure includes operations of forming a first active area and a second active area on the front side of the integrated circuit, forming a conductor coupled to the first active area and the second active area, and forming in the first layer on the back side of the integrated circuit a second conductive line coupled to the first active area and the second active area. The method further includes operations of forming in a second layer below the first layer on the back side of the integrated circuit a third conductive line extending in a first direction, and forming in a third layer below the second layer on the back side of the integrated circuit at least one fourth conductive line extending in a second direction different from the first direction. The third conductive line and the at least one fourth conductive line are coupled between the first conductive line and the second conductive line to transmit the first signal from the first active device to the at least one conductive structure.

In some embodiments, the forming the active device includes forming multiple gates crossing the first conductive line in a layout view, wherein the first conductive line has a width along the second direction at least three times the width of a pitch between two adjacent gates of the gates.

In some embodiments, the method further includes operations of forming a second active device in the first layer on the front side of the integrated circuit, forming a fifth conductive line in a second layer above the first layer on the front side of the integrated circuit to couple the second active device to the conductor of the at least one conductive structure, and forming a sixth conductive line in the first layer on the back side of the integrated circuit. The second active device is coupled to the sixth conductive line to output a second signal corresponding to the first signal received from the at least one conductive structure.

In some embodiments, the method further includes operations of forming multiple second active devices in the first layer on the front side of the integrated circuit, forming multiple fifth conductive lines extending in the second direction in a second layer above the first layer on the front side of the integrated circuit, and forming in a third layer above the second layer on the front side of the integrated circuit a sixth conductive line extending in the first direction to couple the fifth conductive lines with each other. Each of the second active devices is coupled to the first active device through the third conductive line, the at least one conductive structure, the at least one fourth conductive line, and one of the fifth conductive lines.

In some embodiments, the at least one conductive structure includes multiple conductive structures, and the at least one fourth conductive line includes multiple fourth conductive lines. The method further includes operations of forming in the first layer on the front side of the integrated circuit multiple second active devices, and forming multiple fifth conductive lines in a second layer above the first layer on the front side of the integrated circuit. Each of the second active devices is coupled to the first active device through the third conductive line, one of the conductive structures, one of the fourth conductive lines, and one of the fifth conductive lines.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
   a driver cell having a first cell height, comprising:
      a first active area and a second active area that extend in a first direction on a front side of the integrated circuit; and
      a first conductive line extending in the first direction on a back side of the integrated circuit, and being coupled to the first active area and the second active area through a first via and a second via respectively;
   at least one transmission cell having a second cell height different from the first cell height, comprising:
      a third active area and a fourth active area that extend in the first direction on the front side of the integrated circuit;
      a second conductive line extending in the first direction on the back side of the integrated circuit, and being coupled to the third active area and the fourth active area through a third via and a fourth via respectively; and
      a conductor crossing over and being coupled to the third active area and the fourth active area; and
   a plurality of third conductive lines on the back side of the integrated circuit, coupled between the first conductive line and the second conductive line to transmit a signal between the driver cell and the at least one transmission cell.

2. The integrated circuit of claim 1, wherein the first cell height is twice as long as the second cell height.

3. The integrated circuit of claim 1, wherein the first conductive line is further coupled to the first active area and the second active area through a fifth via and a sixth via respectively, wherein the first via and the second via are separated from the fifth via and the sixth via along the first direction.

4. The integrated circuit of claim 1, wherein the second conductive line has a length, along the first direction, that is greater than a poly pitch of the at least one transmission cell.

5. The integrated circuit of claim 1, further comprising:
a pair of power rails extending in the first direction on the back side of the integrated circuit, wherein the first conductive line and the second conductive line are arranged interposed between the pair of power rails.

6. The integrated circuit of claim 5, wherein the driver cell further comprises:
a fifth active area and a sixth active area that are on the front side of the integrated circuit, wherein each of the fifth active area and the sixth active area is coupled to one rail of the pair of power rails;
wherein along a second direction different from the first direction, the fifth active area and the sixth active area have a width greater than widths of the third active area and the fourth active area in the at least one transmission cell.

7. The integrated circuit of claim 1, wherein the at least one transmission cell comprises a plurality of transmission cells;
wherein the integrated circuit further comprises:
a plurality of receiver cells each having at least one gate on the front side of the integrated circuit; and
a plurality of fourth conductive lines, extending above the conductors of the plurality of transmission cells, and configured to couple the conductors of the plurality of transmission cells to the gates of the plurality of receiver cells.

8. The integrated circuit of claim 7, wherein a first line in the plurality of third conductive lines extends in the first direction in a first layer to couple the first conductive line of the driver cell, and
second lines in the plurality of third conductive lines extend in a second direction different from the first direction in a second layer different from the first layer to couple to the second conductive lines of the plurality of transmission cells.

9. The integrated circuit of claim 1, wherein the at least one transmission cell further comprises at least one fifth via coupled between the conductor and a fourth conductive line extending on the front side of the integrated circuit in the first direction;
wherein the integrated circuit further comprises:
a fifth conductive line extending in the first direction on the front side of the integrated circuit;
a sixth conductive line extending in a second direction different from the first direction on the front side of the integrated circuit and coupled to the fourth conductive line and the fifth conductive line; and
a plurality of receiver cells coupled to the fourth conductive line or the fifth conductive line, in order to receive the signal transmitted from the at least one transmission cell.

10. An integrated circuit, comprising:
a driver circuit configured to receive a first signal from a first logic circuit through a first conductive line on a front side of the integrated circuit, and to output a second signal associated with the first signal through a second conductive line that is configured as an output terminal of the driver circuit and on a back side of the integrated circuit,
wherein the driver circuit comprises at least one inverter having a first transistor and a second transistor, wherein the first transistor comprises a first active region and the second transistor comprises a second active region, and the first active region and the second active region are coupled with each other through the second conductive line,
wherein along a first direction, a full width of each of the first active region and the second active region is smaller than a full width of the second conductive line;
at least one transmission unit configured to receive the second signal at an input terminal of the at least one transmission unit, coupled to the second conductive line, and to output the second signal at an output terminal of the at least one transmission unit, wherein the input terminal of the at least one transmission unit is on the back side of the integrated circuit, and output terminal of the at least one transmission unit is on the front side of the integrated circuit; and
at least one receiver circuit configured to receive the second signal through at least one third conductive line, and to output a third signal associated with the second signal to a second logic circuit,
wherein the at least one third conductive line is on the front side of the integrated circuit and coupled between the output terminal of the at least one transmission unit and the at least one receiver circuit.

11. The integrated circuit of claim 10, further comprising:
a fourth conductive line arranged on the back side of the integrated circuit, wherein the fourth conductive line is coupled between an output terminal, on the back side of the integrated circuit, of the at least one receiver circuit and an input terminal of the second logic circuit to transmit the third signal.

12. The integrated circuit of claim 10, wherein the at least one receiver circuit comprises a plurality of receiver circuits,
wherein the at least one third conductive line comprises a plurality of first lines in a first layer and a second line in a second layer above the first layer,
wherein the plurality of first lines are coupled between the output terminal of the at least one transmission unit and input terminals of the plurality of receiver circuits, and the second line is coupled between at least two of the plurality of first lines.

13. The integrated circuit of claim 10, wherein the at least one receiver circuit comprises a plurality of receiver circuits, and the at least one transmission unit comprises a plurality of transmission units,
wherein the integrated circuit further comprises a fourth conductive line in a first layer and a plurality of fifth conductive lines in a second layer different from the first layer,
wherein the fourth conductive line is coupled between the output terminal of the driver circuit and the plurality of fifth conductive lines, and
each of the plurality of fifth conductive lines is coupled between the fourth conductive line and the input terminal of one of the plurality of transmission units.

14. The integrated circuit of claim 10,
wherein the first active region is on the front side of the integrated circuit and included in a structure as a drain terminal of the first transistor, and the second active region is on the front side of the integrated circuit and included in a structure as a drain terminal of the second transistor.

15. The integrated circuit of claim 14, wherein the at least one inverter is configured to receive a first supply voltage and a second supply voltage by a pair of power rails on the back side of the integrated circuit,
wherein the second conductive line is arranged between the pair of the power rails.

16. An integrated circuit, comprising:
a driver cell comprising:
- a first active area and a second active area that extend in a first direction on a front side of the integrated circuit; and
- a first conductive line extending in the first direction on a back side of the integrated circuit, and being coupled to the first active area and the second active area through a first via and a second via respectively, wherein a full width of the first conductive line is greater than a full width of each of the first active area and the second active area;

at least one transmission cell comprising:
- a third active area and a fourth active area that extend in the first direction on the front side of the integrated circuit; and
- a second conductive line extending in the first direction on the back side of the integrated circuit, and being coupled to the third active area and the fourth active area; and a plurality of third conductive lines arranged on the back side of the integrated circuit and coupled between the first conductive line and the second conductive line to transmit a first signal between the driver cell and the at least one transmission cell.

17. The integrated circuit of claim 16, wherein the driver cell further comprises:
a fifth active area and a sixth active area that are arranged on opposite sides of each of the first active area and the second active area,
wherein the fifth active area and the sixth active areas are coupled to a fourth conductive line and a fifth conductive lines arranged on the back side of the integrated circuit to receive a first supply voltage and a second supply voltages respectively.

18. The integrated circuit of claim 17, wherein a full width of the fifth active area is greater than the full width of the first active area.

19. The integrated circuit of claim 16, further comprising:
at least one receiver circuit configured to receive the first signal through a fourth conductive line that is on the front side of the integrated circuit and coupled between an output terminal of the at least one transmission cell and the at least one receiver circuit, and to output a second signal associated with the second signal to a first logic circuit.

20. The integrated circuit of claim 19, wherein the at least one receiver circuit comprises a plurality of receiver circuits, and the at least one transmission cell comprises a plurality of transmission units;
wherein a first line in the plurality of third conductive lines in in a first layer and second lines in the plurality of third conductive lines are in a second layer different from the first layer,
wherein the first line is coupled between an output terminal, on the back side of the integrated circuit, of the driver cell and the second lines, and
each of the second lines is coupled between the first line and an input terminal of one of the plurality of transmission units.

* * * * *